US009933451B2

(12) United States Patent
Dupont De Dinechin

(10) Patent No.: US 9,933,451 B2
(45) Date of Patent: Apr. 3, 2018

(54) METHOD FOR DETERMINING A STATE OF CREDIBILITY OF MEASUREMENTS OF AN INCIDENCE SENSOR OF AN AIRCRAFT AND CORRESPONDING SYSTEM

(71) Applicant: DASSAULT AVIATION, Paris (FR)

(72) Inventor: Sebastien Dupont De Dinechin, Aix en Provence (FR)

(73) Assignee: DASSAULT AVIATION, Paris (FR)

( * ) Notice: Subject to any disclaimer, the term of this patent is extended or adjusted under 35 U.S.C. 154(b) by 16 days.

(21) Appl. No.: 14/388,775

(22) PCT Filed: Mar. 26, 2013

(86) PCT No.: PCT/EP2013/056432
§ 371 (c)(1),
(2) Date: Sep. 26, 2014

(87) PCT Pub. No.: WO2013/144157
PCT Pub. Date: Oct. 3, 2013

(65) Prior Publication Data
US 2015/0052994 A1 Feb. 26, 2015

(30) Foreign Application Priority Data
Mar. 28, 2012 (FR) ...................... 12 00927

(51) Int. Cl.
*B64F 5/60* (2017.01)
*G01P 13/02* (2006.01)
*G01P 21/02* (2006.01)

(52) U.S. Cl.
CPC .............. *G01P 13/025* (2013.01); *B64F 5/60* (2017.01); *G01P 21/025* (2013.01)

(58) Field of Classification Search
CPC .......... G01P 21/00; G01P 13/025; G01P 5/14; G01P 3/806; G01P 5/16; G01P 21/025;
(Continued)

(56) References Cited

U.S. PATENT DOCUMENTS 5,590,853 A * 1/1997 Greene .................. B64C 13/10
                                                                244/184
6,073,084 A   6/2000 Le Tron
(Continued)

FOREIGN PATENT DOCUMENTS

EP          0863451 A1    9/1998
WO    WO 2004/113929 A1  12/2004

OTHER PUBLICATIONS

International Search Report from corresponding International Application PCT/EP2013/056432.

*Primary Examiner* — Harshad R Patel
*Assistant Examiner* — Brandi Hopkins
(74) *Attorney, Agent, or Firm* — Davidson, Davidson & Kappel, LLC

(57) ABSTRACT

A method for determining a state of credibility of measurements of an angle-of-attack sensor of an aircraft is provided. This method includes at least one coherence test between angle-of-attack measurements from said angle-of-attack sensor, and the measurements of a flight characteristic of the aircraft, distinct from the angle-of-attack. The coherence test includes determining an angle-of-attack value from said angle-of-attack sensor, determining said flight characteristic of the aircraft, determining a value of at least one indicator of the coherence of the angle-of-attack value with the value of said flight characteristic, and activating a low state of credibility, in which the measurements of said angle-of-attack sensor are deemed unreliable, or an intermediate state of credibility, in which the measurements from said angle-of-attack sensor are deemed coherent with said flight characteristic, based on the value of said coherence indicator.

29 Claims, 6 Drawing Sheets

(58) Field of Classification Search
CPC .......... B64D 43/02; B64D 2700/62254; B64D 2700/62298; B64D 43/00; G01G 19/07; G01G 19/414; G01G 23/01; G01M 9/06; G01B 21/00; G05D 1/0077; G05D 1/0858; B64C 19/00; G01C 23/00
USPC ....... 73/65.06, 170, 180; 701/3–5, 7, 10, 14; 702/94, 175, 182; 244/177, 181
See application file for complete search history.

(56) References Cited

U.S. PATENT DOCUMENTS

| | | | |
|---|---|---|---|
| 7,257,470 B2 * | 8/2007 | Hongerholt | G01P 13/025 701/3 |
| 2003/0126923 A1 | 7/2003 | Schulze | |
| 2005/0043865 A1 * | 2/2005 | Seve | G01P 5/16 701/7 |
| 2011/0208375 A1 * | 8/2011 | Spoerry | G01P 13/025 701/14 |
| 2013/0030610 A1 * | 1/2013 | Goupil | G05D 1/0077 701/3 |
| 2013/0317691 A1 * | 11/2013 | Schott | G01P 13/025 701/30.3 |
| 2015/0260749 A1 * | 9/2015 | Luo | G01C 21/20 701/14 |

* cited by examiner

METHOD FOR DETERMINING A STATE OF CREDIBILITY OF MEASUREMENTS OF AN INCIDENCE SENSOR OF AN AIRCRAFT AND CORRESPONDING SYSTEM

The present invention relates to a method for determining a state of credibility of measurements done by at least one angle-of-attack sensor of an aircraft during a flight of said aircraft. The flight operation and control of an aircraft is dependent on the knowledge of the flight parameters of the latter, such as its speed relative to the ambient air, its altitude and angle-of-attack.

BACKGROUND

These parameters are determined by means of sensor probes located on the fuselage of the aircraft. In a known manner, these sensor probes include static pressure sensors, Pitot probes for measuring the total pressure, angle-of-attack probes mounted on a pneumatic device or a vane/paddle type device, and total temperature probes.

These probes are then connected to the means for determining the corresponding magnitude or quantity. In particular, an anemometer determines the speed of the aircraft relative to the air based on the measurements of total and static pressure, and an altimeter determines the altitude of the aircraft based on the measurements of static pressure.

These measurements are then pooled and displayed on a display device which constitutes a central information source based on which the flight operation and control of the aircraft is carried out.

In a known manner, the angle-of-attack probes and pressure probes are in the form of vanes and tubes protruding from the skin of the aircraft. They are thus exposed to meteorological or mechanical factors which can affect or alter the operation thereof, in particular by clogging the orifices of these probes with frost or dust or insects, or by blocking the vane devices.

Such failures lead to the generation of incorrect measurement readings, and in particular the display of false angle-of-attacks, speeds and/or altitudes that may lead to the pilot performing inappropriate maneuvers. For example, false flight control information can lead to the stalling of the aircraft or loss of control thereof on account of excessive speed.

In order to minimize the consequences of such malfunctions and failures, aviation regulations require aircraft manufacturers to provide for redundant means for measuring these critical features.

Thus, aircraft typically include at least one stand by sensor probe that is identical to each probe that may likely fail. However, this solution has not proven to be entirely satisfactory.

Indeed, the existing stand by sensor probes are for the most part of the protruding type and as a consequence present the same risks of malfunction or failure as the probes that they are intended to eventually replace.

Thus, in the event of the malfunction or failure of measurement probes, no reliable measurements are provided to the pilot.

Moreover, the pilot does not have any available means for verifying the reliability of the data and information provided by the sensor probes.

SUMMARY OF THE INVENTION

An object of the invention is thus related to detecting any possible malfunctions of the aircraft's sensors so as to be able to alert the pilot to these malfunctions and to provide them with reliable alternative data and information.

To this end, the object of the invention thus relates to a method of the aforementioned type, characterized in that it comprises at least one coherence test between the angle-of-attack measurements of the aircraft, coming from said angle-of-attack sensor, and the measurements of at least one flight characteristic of the aircraft, distinct from the angle-of-attack, comprising the following steps:

determining at least one angle-of-attack value of the aircraft from at least one measurement from said angle-of-attack sensor, determining at least one value of said flight characteristic of the aircraft, determining a value of at least one indicator of the coherence of the angle-of-attack value with the value of said flight characteristic, activating a low state of credibility, in which the measurements of said angle-of-attack sensor are deemed unreliable, or an intermediate state of credibility, in which the measurements from said angle-of-attack sensor are deemed coherent with the measurements of said flight characteristic, based on the value of said coherence indicator.

According to particular embodiments, the determining method includes one or more of the following characteristic features, taken into consideration individually or in accordance with any technically possible combination:

said coherence test comprises a dynamic coherence test, in which said flight characteristic is a load factor of the aircraft, said method comprising the activation of the low state of credibility or of a first intermediate state of credibility as a function of the value of said coherence indicator;

said coherence indicator measures a dynamic coherence between the angle-of-attack and load factor values over first and second time intervals;

said coherence indicator is a statistic correlation coefficient between said angle-of-attack values and said load factor values over said first and second time intervals, determined in the form:

$$Corr_\phi(n_Z, \alpha) = \frac{Cov_\phi(n_Z, \alpha)}{\varepsilon_{n_Z} \varepsilon_\alpha},$$

where $Cov_\phi(n_Z,\alpha)$ designates a covariance between said angle-of-attack values $\alpha$ and said load factor values $n_Z$, $\varepsilon_\alpha$ designates a standard deviation of the angle-of-attack values $\alpha$ over said first interval and $\varepsilon_{n_Z}$ designates a standard deviation of the load factor values $n_Z$ over said second interval;

the determination method comprises comparing an absolute value of said coherence indicator with a predetermined correlation threshold, the low state of credibility being activated if said coherence indicator is below said correlation threshold and the intermediate state of credibility being activated if said coherence indicator is above or equal to said correlation threshold;

said dynamic coherence test comprises a prior determination step for determining a relevance of said dynamic coherence test, comprising determining a dispersion value of said load factor values over said second interval, said dynamic coherence test being deemed relevant if said dispersion value is greater than or equal to a predetermined dispersion threshold and irrelevant if said dispersion value is below said dispersion threshold;

the results of said dynamic coherence test are not taken into account when the dynamic coherence test is deemed irrelevant;

said coherence test comprises a static coherence test, in which said flight characteristic is a pitch angle of the aircraft, said coherence indicator measuring a static coherence between said value of the angle-of-attack and a pitch angle value, said method comprising activating the state of low credibility or a second state of intermediate credibility as a function of the value of said coherence indicator;

the determination of a coherence indicator between said angle-of-attack value and said pitch angle value comprises determining a difference between said pitch angle value and said angle-of-attack value, said angle-of-attack and pitch angle values being deemed coherent if the absolute value of said difference is above a predetermined difference threshold and not coherent if the absolute value of said difference is above said predetermined difference threshold;

said static coherence test comprises a prior determination step for determining a relevance of said static coherence test, comprising determining a flight path angle of the aircraft and a bank angle of the aircraft and comparing said flight path angle to a predetermined threshold, and comparing said bank angle to a predetermined bank angle threshold, said static coherence test being deemed relevant if said flight path angle and said bank angle are below or equal to said flight path angle and bank angle thresholds, respectively, and irrelevant if said flight path angle is above said flight path angle threshold and/or said bank angle is below said bank angle threshold;

the results of said static coherence test are not taken into account when the static coherence test is deemed irrelevant;

the method comprises, when said first and second intermediate states of credibility are successively activated in a time interval below a predetermined threshold, the activation of a state of low credibility, in which the angle-of-attack measurements of said angle-of-attack sensor are deemed reliable;

the method comprises, at least when the state of low credibility is activated, a step for determining secondary speed information independent of the measurements from said angle-of-attack sensor, and a step for providing a crew of the aircraft with said secondary information.

The object of the invention also relates to a system for determining a state of credibility of measurements from at least one angle-of-attack sensor of an aircraft during a flight of said aircraft, characterized in that it comprises means for carrying out at least one coherence test between angle-of-attack measurements of the aircraft, coming from said angle-of-attack sensor, and measurements of at least one flight characteristic of the aircraft, separate from the angle-of-attack, comprising:

means configured to determine at least one angle-of-attack value of the aircraft from measurements from said angle-of-attack sensor, means configured to determine at least one value of said flight characteristic of the aircraft, means configured to determine a value of at least one indicator of the coherence of the angle-of-attack value with the value of said flight characteristic, means configured to activate a low state of credibility, in which the measurements of said angle-of-attack sensor are deemed unreliable, or an intermediate state of credibility, in which the measurements from said angle-of-attack sensor are deemed coherent with the measurements of said flight characteristic, based on the value of said coherence indicator.

BRIEF SUMMARY OF THE DRAWINGS

The invention will be better understood upon review of the description which follows, provided solely by way of example and with reference made to the following drawings, in which.

DETAILED DESCRIPTION

Figure 1:
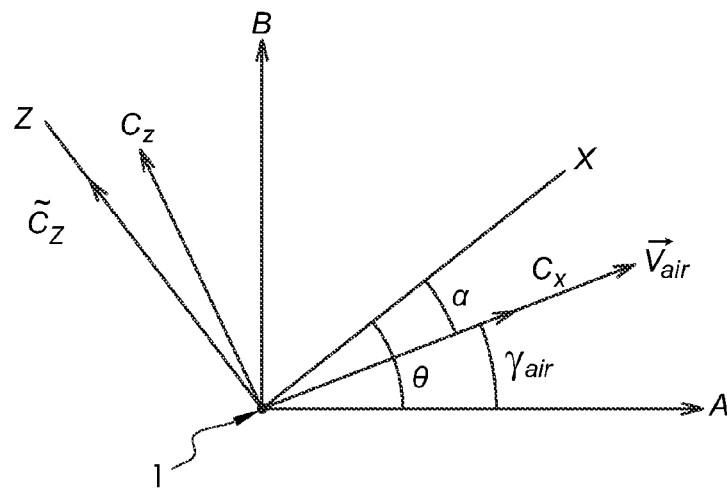
FIG. 1 schematically illustrates an aircraft under the conventional flight conditions, in which the invention is applied.

FIG. 1 represents, in a schematic manner, an aircraft 1 in flight to which is applied the method according to the invention.

The aircraft 1 is represented in FIG. 1 by its sole centre of gravity. Its longitudinal axis is oriented along an axis X, which forms with the horizontal A an angle $\theta$ known as the aircraft pitch angle. It moves relative to the air along a velocity vector $\vec{V}_{air}$, that forms with the horizontal A an angle $\gamma_{air}$ known as the flight path angle of the aircraft. The angle $\alpha$ between the longitudinal axis X of the aircraft 1 and its velocity vector is known as the angle of angle-of-attack. These angles thus satisfy the relationship: $\theta = \alpha + \gamma_{air}$.

The true air speed $\vec{V}_P$ of the aircraft, which is its speed relative to the air in a horizontal plane, is linked to its speed $\vec{V}_S$ relative to the ground in this horizontal plane by the velocity triangle in accordance with the relationship: $\vec{V}_P = \vec{V}_S - \vec{W}$, wherein $\vec{W}$ denotes the wind velocity vector in the horizontal plane.

Figure 2:
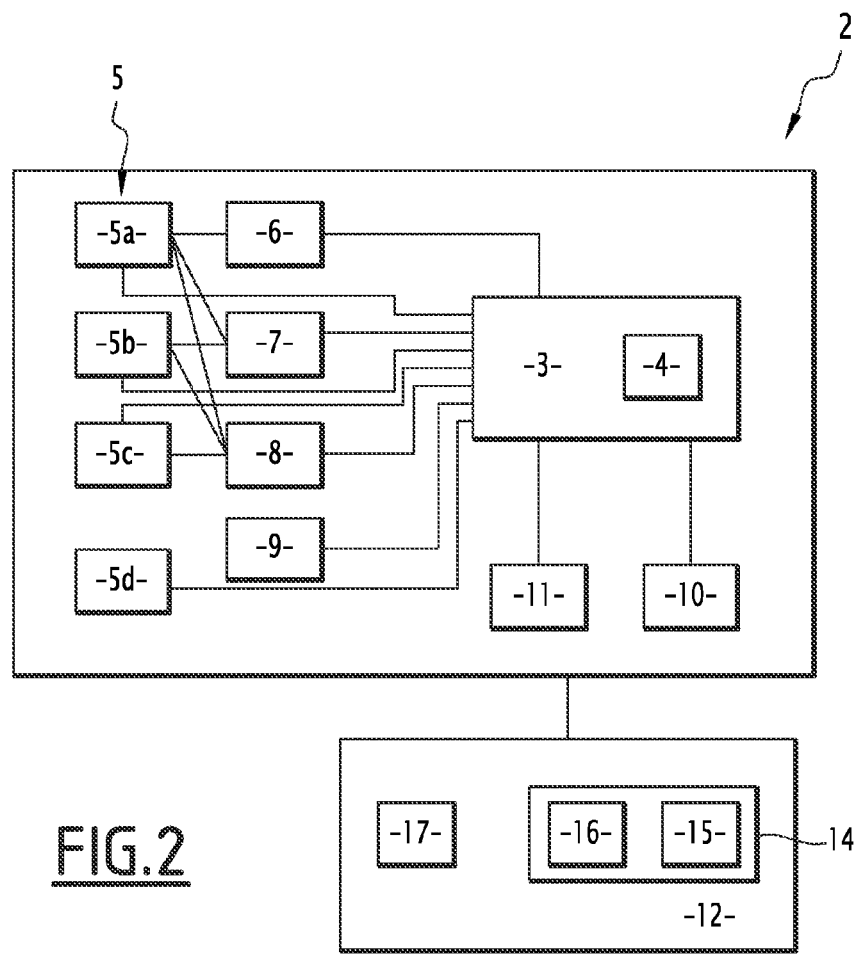
FIG. 2 is a general block diagram representing the system according to the invention.

The system 2 for determination of the parameters of the aircraft 1 according to the invention is represented schematically in FIG. 2. The system 2 is capable of determining the essential characteristics of the aircraft 1 or of the ambient air during the flight, and of assessing the reliability of sensor measurements of the aircraft 1.

This system 2 comprises a central computer 3 equipped with a memory 4. The memory 4 includes in particular correlation look up tables and charts and graphs providing the value of a flight characteristic of the aircraft depending on the value of one or more other characteristics. In particular, the memory 4 includes a standard atmosphere table giving the pressure altitude of the aircraft, denoted by $Z_P$, based on the static pressure around the aircraft. This pressure altitude is defined as the altitude that an aircraft would have attained in a standard atmosphere if it was at this static pressure.

The memory 4 also includes a correlation look up table providing the value of a coefficient of lift of the aircraft based on values of the Mach number M and the angle-of-attack $\alpha$ of the aircraft. This correlation look up table is derived from flight tests conducted in advance. The memory 4 further includes charts and graphs, such as a chart that makes it possible to determine the weight of the aircraft 1 based on the lift and drag during the initial phase of take off, and on the resulting acceleration.

This system 2 further comprises a plurality of sensors 5, and in particular a static pressure sensor 5a, a total pressure sensor 5b, a temperature sensor 5c, and an angle-of-attack sensor 5d.

The static pressure sensor 5a is capable of measuring the static pressure $P_S$, that is to say the atmospheric pressure at the level of the aircraft. The total pressure sensor 5b is for example a Pitot probe. It is capable of measuring the total pressure $P_T$, the sum of the dynamic pressure $P_{dyn}$ and the static pressure $P_S$.

The temperature sensor 5c is capable of measuring the total temperature, denoted by TAT for "Total Air Temperature", corresponding to the impact temperature of air in the probe meant to be used for the measurement. This temperature is constant throughout the stream of air that enters the probe.

The total temperature is related to the static temperature of air, denoted by SAT "Static Air Temperature", and corresponding to the temperature that would be measured by a thermometer in the air mass brought to rest, by the relationship:

$$SAT = \frac{TAT}{\left(1 + \frac{\gamma - 1}{2} M^2\right)} \approx \frac{TAT}{(1 + 0.2\ M^2)} \quad (1)$$

where M denotes the Mach number of the aircraft and $\gamma \approx 1.4$ is the adiabatic coefficient of air.

The angle-of-attack sensor 5d is capable of determining the angle-of-attack of the aircraft 1.

All of the sensors are connected to the computer 3.

The determination system 2 also comprises an altimeter 6, an anemometer 7, a Mach indicator 8, and an accelerometer 9.

The altimeter 6 is connected to the static pressure sensor 5a and the computer 3. It is capable of determining the pressure altitude $Z_P$ of the aircraft 1 relative to a reference level based on the measurement of the static pressure $P_S$. To this end, the altimeter 6 uses for example a standard atmosphere table that includes tabulated values of static pressure as a function of altitude.

The anemometer 7 is connected to the static pressure sensor 5a and total pressure sensor 5b and the computer 3.

It is capable of determining, based on the static pressure $P_S$ and total pressure $P_T$, the dynamic pressure $P_{dyn}=P_T-P_S$, and of inferring from the dynamic pressure the conventional speed $V_C$ of the aircraft relative to the air, based on the relationship:

$$\frac{P_{dyn}}{101325} = \left[1 + 0.2\left(\frac{V_C}{661.471}\right)^2\right]^{3.5} - 1 \quad (2)$$

where 101325 corresponds to the atmospheric pressure over ground, 661.471 is the speed of sound over ground in knots.

The conventional speed is thus given by:

$$V_C = 661.471 \cdot \left[\frac{\left(\frac{P_{dyn}}{101325} + 1\right)^{\frac{1}{3.5}} - 1}{0.2}\right]^{\frac{1}{2}} \quad (3)$$

This conventional speed $V_C$ is that which would produce the same dynamic pressure $P_{dyn}$ when flying in the standard atmosphere over ground.

The equivalent of speed EV can be deduced from the pressure altitude $Z_P$ and from the Mach number M by:

$$\frac{1}{2}\rho_0 EV^2 = \frac{1}{2}\rho a^2 M^2 \quad (4)$$

where $\rho_0$ denotes the density of air on the ground, at the speed of sound and $\rho$ the density of air.

When the Mach number of the aircraft is low (M<0.4), $V_C \approx EV$.

The Mach indicator 8 is connected to the static pressure sensor 5a and the total pressure sensor 5b and to the computer 3. It is capable of deducing from the total pressure $P_T$ and the static pressure $P_S$ the Mach number of the aircraft. Thus $M_a$ will be used to denote the Mach number as determined by the Mach indicator 8.

The accelerometer 9 includes an inertial navigation unit. It is capable of determining an acceleration vector $\vec{J}$ of the aircraft, and in particular its components Jx and Jz along the longitudinal axis X of the aircraft and the yaw axis Z of the aircraft 1 respectively.

The determination system 2 further comprises a geographical position sensor, advantageously an altitude sensor, such as a satellite position sensor, for example a GPS sensor 10. This GPS sensor 10 is capable of determining the position of the aircraft 1, in particular its altitude expressed in a conventional manner above the reference geoid WGS 84 (for World Geodetic System), known as altitude GPS $Z_{GPS}$. Based on this position, the system 2 is capable of estimating the horizontal speed $\overrightarrow{GS}$ of the aircraft 1 relative to the ground, the speed $V_Z(GPS)$ of the aircraft 1 along a vertical axis B and a reconstituted pressure altitude, denoted by $Z_P^{}$. The GPS sensor 10 is connected to the computer 3**.

The computer 3 is capable of determining, based on a Mach value M of the aircraft, its speed relative to air, known as true air speed and denoted by TAS for "true air speed", in accordance with the relationship:

$$TAS = M\sqrt{\gamma R \cdot SAT} \quad (5)$$

where $\gamma$ is the adiabatic coefficient of air and R is the universal gas constant The computer 3 is also capable of determining the air speed standard $V_p$ of the aircraft, the horizontal projection standard of true air speed TAS, based on the relationship:

$$TAS^2 = V_p^2 + V_z^2(GPS) \qquad (6)$$

The determination system 2 in addition comprises the means 11 for determining the quantity of fuel contained in the fuel tanks of the aircraft 1. The means 11 are connected to the computer 3. These means comprise for example gauges for tanks and flowmeters. The tank gauges are capable of measuring the quantity, in particular the weight of fuel in each tank, enabling the computer 3 to determine the weight of fuel in the aircraft 1. The flowmeters are capable of measuring the mass flow of fuel supplied to each engine, enabling the computer 3 to deduce the weight FU of fuel consumed, and based on an initial measurement of the fuel weight, the weight of fuel remaining.

The aircraft 1 comprises the means 12 for human-machine interface. These means 12 are connected to the determination system 2. They are capable of presenting data and information intended for the crew and in particular the pilot, and receiving instructions from the pilot in particular intended for the determination system 2.

The aircraft 1 thus includes dashboard instruments that are capable of presenting to the pilot data and information relative to the flight of the aircraft 1. In particular, these instruments include conventional display means, capable of displaying the characteristics of the flight derived from the measurements of pressure and angle-of-attack by the pressure and angle-of-attack sensors.

The aircraft 1 also comprises an auxiliary display device 14. The auxiliary display device 14 includes the means 15 for selectively displaying various different assessments of characteristics of the flight, based on a state of credibility assigned to the measurements made by the sensors, in particular the angle-of-attack and pressure sensors.

The auxiliary display device 14 is in addition complemented by the means 16 for displaying alerts and warning—alert messages meant to inform the pilot of the state of credibility assigned to measurements from sensors, and in particular to warn them when the measurements from one or more sensors are not reliable. These messages may be visual and/or audio signals, for example light signals. Advantageously, these signals are text based or symbol based messages and are included in the device for displaying resident avionics faults.

The aircraft 1 also includes an input interface 17, for example control buttons and a keyboard, thereby enabling the pilot to give instructions to the determination system or to enter numerical values of flight parameters.

Figure 3:
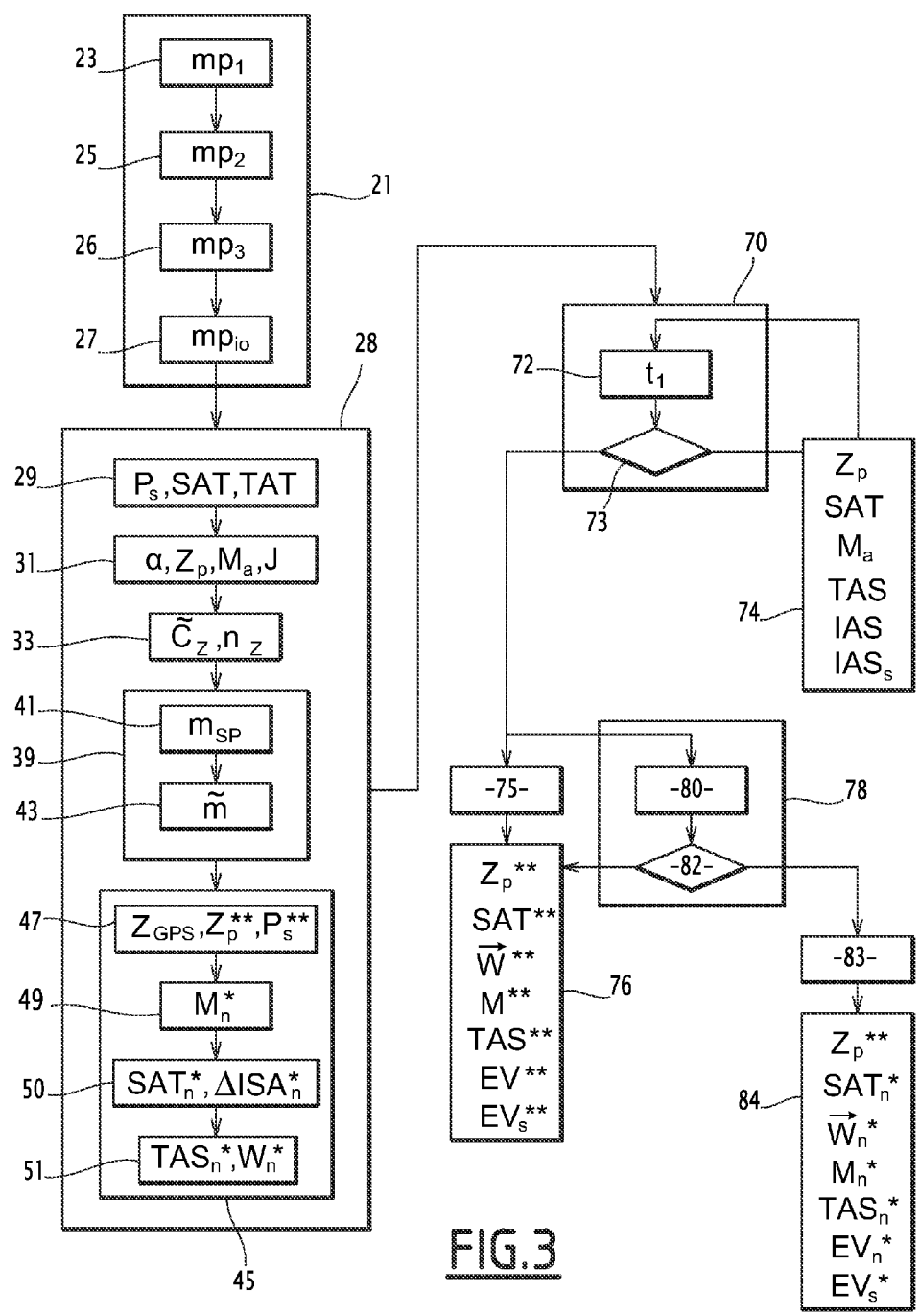
FIG. 3 is a block diagram illustrating the method according to the invention.

Shown in FIG. 3 is an example of the implementation of the method according to an embodiment of the invention, for monitoring the credibility of flight operation and control information and data provided by the sensor probes and measuring apparatus of this aircraft, and in particular the measured values of pressure and angle-of-attack.

The method includes a step 21 of determining an initial weight at the ramp $mp_{i0}$ of the aircraft 1, in view of determining an estimated weight of the aircraft 1 at any instant in time during its flight.

This initial weight at the ramp $m_{pi0}$ is developed by estimating, according to different methods, multiple weights $m_{pi}$ at the ramp of the aircraft 1 and by determining the initial weight at the ramp $mp_{i0}$ of the aircraft 1 based on the estimates $m_{pi}$ thus obtained.

The step 21 thus advantageously comprises the determination of three ramp weights $m_{p1}$, $m_{p2}$, $m_{p3}$, and the selection as value of the initial weight at ramp $m_{pi0}$ of the median value of the three weights ($i_0$=1, 2 or 3).

The step 21 comprises a phase 23 of determining the first weight at the ramp $m_{p1}$ of the aircraft 1, at an initial time instant $t_1$ prior to the take off of the aircraft 1. This ramp weight is determined by estimating and summing up the base weight of the aircraft 1, the fuel weight and the load weight. This weight is generally not accurate. In particular, measurement of the weight of fuel contained in the fuel tanks is not an exact measurement. It is estimated that the error made in this weight $m_{p1}$ is of the order of a few percent.

In addition, the base weight and the load weight are likely to be subject to errors due to the measurement, the transmission of data and information, to the pilot and/or due to data entered into the system.

The step 21 includes a phase 25 of determining the second weight at the ramp $m_{p2}$ of the aircraft 1, carried out during take off, at a chosen time instant $t_2$, for example 3 seconds after the end of the landing gear shock strut compression signal "Weight off wheels".

This second ramp weight $m_{p2}$ is determined based on the characteristics of the aircraft at the time instant $t_2$, in particular the nominal engine thrust at take off under the conditions of calibration, temperature and pressure input by the pilot, and the theoretical drag of the aircraft in the configuration "landing gear down+flaps for take off" in the measured conditions of speed and angle-of-attack of the aircraft.

The phase 25 includes the determination of a weight $m_2$ of the aircraft 1 at the time instant $t_2$ during take off, to which is added the weight of fuel $FU(t_2)$ consumed since take off. The phase 25 comprises for this purpose the determination of shearing forces F and the drag forces T exerted on the aircraft 1 at this time instant $t_2$.

The phase 25 includes in particular the measurement of total air temperature TAT by the temperature sensor 5c and the determination of the static temperature SAT by the computer 3 based on this measurement. It further comprises the measurement of the angle-of-attack α by the angle-of-attack sensor 5d, the measurement of static pressure Ps by the static pressure sensor 5a, of the longitudinal acceleration Jx and along the axis Z $J_z$ of the aircraft 1 by the accelerometer 9, and of a speed data value of the aircraft.

This speed data value is advantageously a Mach number independent of the measured pressures and angle-of-attack α, denoted by M. The Mach number M is determined from the velocity triangle, on the basis of the relationship:

$$M^{**}(t_2) = \frac{\left\| \vec{GS} + V_Z(GPS)\vec{k} - \vec{W}(t_2) \right\|}{\sqrt{\gamma R \cdot SAT(t_2)}} \qquad (7)$$

In which:

$\vec{GS}$ and $V_Z(GPS)$ are respectively the horizontal speed of the aircraft 1 relative to the ground and the speed of the aircraft 1 along the vertical axis B, derived from the pressure altitude GPS relative to time determined based on measurements made by the GPS sensor 10 at the time instant $t_2$;

$\vec{k}$ is an ascending unit vector parallel to the vertical axis B;

$\vec{W}(t_2)$ is a wind velocity vector at take off input by the pilot; and $SAT(t_2)$ is the static temperature at take off.

At this time instant $t_2$, the wheels of the aircraft 1 are no longer in contact with the ground, in a manner such that the drag force T is determined based on the determined values of the Mach number M** and angle-of-attack α.

The drag force T is for example determined based on the equation of propulsion of the aircraft given by:

$$T=0.7SP_SM^{2}\tilde{C}_X(\alpha,M^{},\text{conf}) \qquad (8)$$

where $\tilde{C}_X$ denotes an estimate of the drag coefficient of the aircraft, as a function of the angle-of-attack α, the Mach number M** and the flight configuration of the aircraft 1, denoted by "conf", relating in particular to the extended flaps (here first segment configuration).

The drag coefficient $\tilde{C}_X$ is estimated for example from a correlation look up table stored in the memory 4 of the computer 3, providing an estimate of the value of $\tilde{C}_X$ based on the Mach number M** and the angle-of-attack α of the aircraft 1. However, the drag coefficient depends weakly on the Mach number, and it may be advantageous, in order to simplify the method, to determine $\tilde{C}_X$ as a function of the angle-of-attack α and the configuration only, or even to fix the $\tilde{C}_X$ value.

The shearing force F, due to the engines, is a known function of the temperature and pressure.

The weight $m_2$ of the aircraft 1 at take off is linked to the acceleration $J_X$, to the drag T and to the shearing force F by the relationship:

$$J_x = \frac{F_X + T_X}{m_2} \qquad (9)$$

wherein $F_X$ and $T_X$ are projections of the shearing force F and the drag T respectively on the X axis.

The weight $m_2$ is for example determined based on the acceleration, the drag and the shearing force, by means of a calculation chart established in advance and stored in the memory 4.

The calculation chart is established by determining by weighing in a precise manner the exact weight of the aircraft for a series of test flights, and then measuring for each test flight the corresponding acceleration $J_X$, with different configurations of the aircraft. This acceleration is measured with an accelerometer.

The second weight $m_{p2}$ at the ramp is determined based on the weight $m_2$ at take off and a measurement made by the flow meters of the weight of fuel consumed between the time instants $t_1$ and $t_2$. The second weight at the ramp $m_{p2}$ is thus equal to:

$$m_{p2}=m_2(t_2)+FU(t_2) \qquad (10)$$

where $FU(t_2)$ denotes the weight of fuel consumed between the time instants $t_1$ and $t_2$.

The step 21 further includes a determination phase 26 of determining the third weight at the ramp $m_{p3}$ of the aircraft 1, also carried out during take off The determination 26 of the third ramp weight $m_{p3}$ comprises the determination of a weight $m_3$ of the aircraft 1 at a time instant $t_2$ during take off, to which is added the weight of fuel $FU(t_2)$ consumed since take off.

The weight $m_3$ is calculated on the basis of an equation of lift of the aircraft that correlates its effective weight at time instant $t_2$, the load factor $n_z$, the measured angle-of-attack α, the estimated Mach number M**, and the measured static pressure Ps.

The equation of lift of the aircraft is given in a general manner by:

$$n_z mg=0.7SP_SM^2\tilde{C}_Z(\alpha,M,\text{conf}) \qquad (11)$$

where m is the weight of the aircraft, S represents a reference surface of the aircraft, $n_Z$ is the load factor of the aircraft 1 along the axis Z, M is the Mach number of the aircraft and $\tilde{C}_Z$ is a coefficient of lift of the aircraft 1 along the axis Z.

The phase 26 thus comprises the determination of the load factor $n_Z$, the static pressure Ps, the Mach number, and coefficient of lift of the aircraft 1 at time instant $t_2$.

The load factor $n_Z$ at time instant $t_2$ is then determined by the computer 3 based on the expression:

$$n_z(t_2) = \frac{J_z(t_2)}{g} \qquad (12)$$

where $J_Z$ is the acceleration along the axis Z determined by the accelerometer 9 at time instant $t_2$.

The coefficient of lift $\tilde{C}_Z(t_2)$ estimated at time instant $t_2$ is a projection along the axis Z perpendicular to the longitudinal axis of the aircraft 1 of the coefficient of lift $C_Z$ along an axis orthogonal to the velocity vector of the aircraft 1, and of the drag coefficient $C_X$ parallel to this velocity vector. The coefficient of lift $\tilde{C}_Z$ therefore satisfies: $\tilde{C}_Z=C_X\sin\alpha+C_Z\cos\alpha$. In general it mainly comprises a lift term.

The coefficient of lift $\tilde{C}_Z$ is a function of the angle-of-attack α, the Mach number M and the flight configuration of the aircraft 1, relative in particular to the extended flaps. At the time instant $t_2$ considered, it is the first segment configuration (landing gear down and flap setting selected for take off).

The coefficient of lift $\tilde{C}_Z$ is estimated for example based on a correlation look up table stored in the memory 4 of the computer 3, providing an estimate of the value of $\tilde{C}_Z$ based on the Mach number and the angle-of-attack of the aircraft 1.

This correlation look up table is determined in advance by performing a series of test flights for a given model of aircraft. Various different configurations of angle-of-attack, of weight factor, load and Mach, and various different configurations of aircraft are scanned in order to determine in each case the $\tilde{C}_Z$ coefficient.

The coefficient of lift is thus estimated by means of using the correlation look up table based on the Mach number M($t_2$) determined at the time instant $t_2$ and an angle-of-attack value α($t_2$) measured by the angle-of-attack sensor at this time instant $t_2$, in the first segment configuration. It is thus denoted as $\tilde{C}^{}_Z(t_2):\tilde{C}^{}_Z(t_2)=\tilde{C}_Z(\alpha(t_2), M^{}(t_2), 1^{st}$ segment).

The weight $m_3$ of the aircraft 1 at time instant $t_2$ is thus deduced from the equation of lift and in accordance with the expression:

$$m_3(t_2) = \frac{0.7SP_SM^{2}(t_2)\tilde{C}^{}_z(t_2)}{n_z(t_2)g} \qquad (13)$$

The weight at the ramp $m_{p3}$ is derived by adding the weight of fuel consumed $FU(t_2)$ between the time instant $t_1$ and the time instant $t_2$, determined from the measurements of flow meters.

$$m_{p3}=m_3(t_2)+FU(t_2) \qquad (14)$$

The three ramp weights $m_{p1}$, $m_{p2}$ and $m_{p3}$ thus determined are generally different. The step 21 thus includes a phase 27 of determining a value of the initial weight at the ramp of the aircraft 1, denoted by $m_{pi0}$, based on the three ramp weights $m_{p1}$, $m_{p2}$ and $m_{p3}$ determined in advance. This weight at the ramp $m_{pi0}$ is advantageously equal to the median of the weights $m_{p1}$, $m_{p2}$ and $m_{p3}$.

Thus, if the value of one of these weights is an outlier, this outlier is excluded and does not feature in the value of the ramp weight $m_{pi0}$.

During the flight of the aircraft 1, the flight parameters are determined. These parameters include the characteristics of the ambient air and of the flight of the aircraft 1, and are determined in a continuous or periodic manner at time instant $t_v$ of the flight, during a step 28.

This step 28 includes a determination phase 29 of determining the characteristics of the ambient air, in particular the static pressure $P_S$, and the static temperature SAT and the total temperature TAT.

The step 28 also includes a determination phase 31 of determining the flight characteristics of the aircraft 1, and in particular its angle-of-attack $\alpha$ by the angle-of-attack sensor 5d, the altitude pressure $Z_P$ by the altimeter 6, the Mach number $M_a$ by the Mach indicator 8 and the acceleration J by the accelerometer 9, at the time instant $t_v$ considered. The Mach number $M_a$ constitutes a second speed data value, in addition to the speed equivalent EV.

The step 28 further includes a determination phase 33 of determining the coefficient of lift $\tilde{C}_z$ and the load factor $n_Z$ of the aircraft 1 along the axis Z based on the values of the Mach number $M_a$, angle-of-attack $\alpha$ and acceleration J determined during the phase 31.

As previously described here above, the load factor $n_Z$ is determined from the expression:

$$n_z = \frac{J_z}{g} \quad (15)$$

where $J_Z$ is the acceleration along the axis Z determined during the phase 31.

Furthermore, the coefficient of lift $\tilde{C}_Z$ is estimated based on the correlation look up table stored in the memory 4 of the computer 3, which provides an estimate of the value of $\tilde{C}_Z$ based on the values of the Mach number $M_a$ and the angle-of-attack $\alpha$ during the phase 31.

In addition the step 28 includes a determination phase 39 of determining an estimated weight $\tilde{m}$ of the aircraft 1 during its flight.

The determination 39 of the estimated weight $\tilde{m}$ includes a determination phase 41 of determining a fourth ramp weight of the aircraft 1, during the flight of the aircraft 1, based on the equation of lift of the aircraft. This fourth weight is thus known as lift weight $m_{sp}$. This lift weight is determined by estimating the instantaneous weight of the aircraft 1 at multiple distinct time instants t during the flight, advantageously in a continuous manner, by deducing from each of the instantaneous weights thus assessed a ramp weight of the aircraft 1, and by establishing a weighted average of these ramp weights.

The instantaneous weight of the aircraft 1 at each time instant t, denoted by $m_4(t)$, is derived from the equation of lift based on the static pressure $P_S$ measured during the phase 29, the Mach number $M_a$ determined during the phase 31, and the coefficient of lift $\tilde{C}_Z$, and the load factor $n_Z$ determined during the phase 33, in accordance with the expression:

$$m_4(t) = \frac{0.7 S P_S M_a^2 \tilde{C}_z(\alpha, M_a, conf)}{n_z g} \quad (16)$$

A weight at ramp $m_4'$ is derived by adding the weight of fuel consumed FU(t) between time instant $t_1$ and time instant t, determined from measurements made by flow meters.

However, this value of ramp weight $m_4'$ depends on measurements that could be erroneous, in particular in the case of turbulence, or failures of measuring instruments.

Thus during the phase 41 the lift weight $m_{sp}$ is determined as a weighted average of the ramp weights $m_4'$ determined between the time instant $t_2$ at take off and the time instant $t_v$, where this average is computed only over the time instants t during which the measurements are considered to be reliable. The lift weight $m_{sp}$ is thus determined at a time instant $t_v$ in accordance with the expression:

$$m_{sp}(t_v) = \frac{\int_{t_2}^{t_v} \chi_m(t)(m_4(t) + FU(t))}{\int_{t_2}^{t_v} \chi_m(t)} \quad (17)$$

here $\chi_m(t)$ denotes a characteristic function of weight taking the value 1 or 0 according to independent geometric and dynamic criteria aimed at characterising the horizontal rectilinear (straight) flight of the aircraft 1.

The value of the function $\chi_m(t)$ at each time instant t is determined by the computer 3. In particular, when the aircraft 1 is in a stable and calm flight phase, that is to say, when the vertical velocity $V_Z$(GPS) derived from the GPS sensor 10 is lower than a predetermined threshold, the absolute value of the inclination (derived from the inertial navigation unit) is less than 5°, the load factor $n_Z$ is close to 1 and an energy of the load factor, defined as its variance is close to zero, $\chi_m(t)$ takes the value 1. In contrast, when the flight is turbulent or not stabilised in a straight line, or when the computer 3 detects a failure of a sensor or measuring instrument, as described here below, it sets the value $\chi_m(t) = 0$.

The lift weight $m_{sp}$ therefore does not have a fixed value, but is adjusted during the flight.

The estimated weight $\tilde{m}$ in of the aircraft 1 is then determined during a step 43 based on the values of weight at ramp $m_{pi0}$ and $m_{sp}$. The estimated weight $\tilde{m}$ is thus of the type $\tilde{m} = f(m_{pi0}, m_{sp})$.

The estimated weight $\tilde{m}$ is for example a weighted sum of the median weight $m_{pi0}$ determined in the step 21 and the lift weight $m_{sp}$. The weighting coefficients are calculated for example from the function $\chi_m(t)$, in a manner such that the coefficient attributed to the lift weight is proportional to the fraction of time during which it was possible for this weight to be determined.

The estimated weight $\tilde{m}$ is in this example given by:

$$\tilde{m}(t_v) = [(1-p(t_v))m_{pi0} + p(t_v)m_{sp}(t_v)] - FU(t_v) \quad (18)$$

where the function $p(t_v)$ is defined by:

$$p(t_v) = \frac{\int_{t_1}^{t_v} \chi_m(t)}{t_v - t_1} \quad (19)$$

Thus, when the flight is stabilised for a long time $p(t_v)$ tends towards 1 and the estimated weight $\tilde{m}$ tends towards the lift weight $m_{sp}$ from which the weight of fuel consumed was subtracted.

Knowledge of the pressure altitude of the aircraft (or of the static pressure surrounding the aircraft) is of paramount importance in any method for analytical monitoring of flight parameters, aiming in particular at detecting possible corruption of the values of static pressure and total pressure measured. Thus, according to the invention, an altitude data value derived from a geographical position sensor is available on a continuous and ongoing basis during the flight of the aircraft 1. This altitude data value is advantageously derived from the GPS sensor 10, the altitude being expressed in a conventional manner above the reference geoid WGS 84.

The phase 47 thus includes the determination of an altitude measured by the GPS and denoted by $Z_{GPS}$, of a pressure altitude estimator, also known as reconstituted pressure altitude and denoted by $Z_P^{}$, and a reconstituted static pressure denoted by $P_S^{}$, determined from the reconstituted pressure altitude $Z_P^{**}$ by means of a standard atmosphere table.

Two modes are to be distinguished. According to a first mode, known as the primary mode, the reconstituted pressure altitude $Z_P^{**}$ is determined by subtracting from the GPS altitude $Z_{GPS}$ an altitude correction term in order to take into account the difference between the standard atmosphere and the actual flight atmosphere. This difference may be due to a pressure at the lower ground level, respectively greater than the standard pressure of 1013 bar, generating an offset of the downward isobaric curves, respectively upwards, and to a non standard temperature gradient between the ground and the aircraft, changing the spacing of the isobars.

This difference is determined at constant intervals DT, for example equal to 30 seconds, by comparison between the reconstituted pressure altitude $Z_P^{**}$ and the pressure altitude $Z_P$ derived from the altimeter 6. These differences constitute a sequence of values $\Delta Z(j)$, where j is a natural number. Successive time instants of measurement of these differences will be denoted by $t(j)$. Thus:

$$\Delta Z(j) = Z_{GPS}(t(j)) = Z_{GPS}(t(j))$$

The altitude correction term is calculated from the differences $\Delta Z(i)$ as a sequence $\Delta Z^{}(j)$ given by the formula $\Delta Z^{}(j) = \Delta Z(i)$, where i is an index less than or equal to j, selected according to the following algorithm:

If no inconsistency in air data, clino-barometric parameters have been declared, that is to say, if the measurements made by the static pressure sensor 5a, total pressure sensor 5b and angle-of-attack sensor 5d have not been deemed to be unreliable, and if $\Delta Z(j) \in [\Delta Z(j-1) - ST; \Delta Z(j-1) + ST]$ the index i is equal to the index j, that is to say $\Delta^{}Z(j) = \Delta Z(j)$. $\Delta^{}Z$ is therefore thus automatically reset.

ST is a tolerance threshold. The verification of the inclusion of $\Delta Z(j)$ in the interval $[\Delta Z(j-1) - ST; \Delta Z(j-1) + ST]$ amounts to analytically analysing the jumps of $\Delta Z(j)$ in a manner so as to disallow an aberrant reset in case of corruption of the pressure altitude $Z_P(t(j))$. The tolerance threshold ST can for example take the value of $100 \text{ ft} + 5\%|V_Z|$. The first term of 100 feet is intended to cover an exceptional altitude isobaric gradient (generator of geostrophic wind) as well as the statistical fluctuation of the altitude value derived from the GPS; the second term equal to 5 percent of the vertical velocity $V_Z(GPS)$ is intended to cover, in case of change in altitude, a temperature difference of not more than the standard 30° C. in absolute value. ST may be advantageously adapted following the analysis of flight test results. By way of example, a geostrophic wind of 200 knots at the pole corresponds to an isobaric gradient of 40 feet in 30 seconds of flight.

If no inconsistency in air data, clino-barometric parameters have been declared, and if $\Delta Z(j) \notin [\Delta Z(j-1) - ST; \Delta Z(j-1) + ST]$, the value of the index i remains equal to its previous value, and $\Delta^{}Z$ is not reset. In addition, the process of resetting of the sequence of altitude deviations $\Delta Z^{}(j)$ to the sequence $\Delta Z$ is stopped until an eventual reset—restart by the pilot as will be described farther below.

When on the contrary the air data, clino-barometric parameters determined from the static pressure sensor 5a, and total pressure sensor 5b angle-of-attack sensor 5d are considered to be inconsistent and therefore unreliable, as described here below, the process of resetting of the sequence of altitude deviations $\Delta Z^{}(j)$ to the sequence $\Delta Z$ is stopped. Thus, the value i is fixed at the last "relevant" index, that is to say corresponding to a past time instant of the flight for which the inconsistency was not yet manifested. Thus, i<j. Thus the process of resetting of the sequence of altitude deviations $\Delta Z^{}(j)$ to the sequence $\Delta Z$ is stopped until the eventual reset—restart by the pilot.

Moreover, the pilot has available a reset command dedicated to the manual resetting of $\Delta Z^{}$. Thus, when i≠j due to an inconsistency of air data, clino-barometric parameters or a pressure altitude improbability, the pilot can, based on external information which may be available to them, activate this command in order to, on the one hand force the jumping of the index j, which resynchronises the beats of DT at the instant of pressing the button, on the other hand in order to restart the periodic resetting of i to j, unless an inconsistency of clino-barometric, air data parameters is once again detected or an aberrant resetting occurs again. This reset command is for example a push button located on the auxiliary display device 14. In particular, it makes it possible to force the resetting of $\Delta Z^{}$ to a measured value of $Z_{GPS} - Z_P$ at the moment of actuation of the command.

The reconstituted pressure altitude $Z_P^{**}$ is thus determined at each time instant t based on the expression:

$$Z_P^{**}(t) = Z_{GPS}(t) - \Delta Z(j) \quad (20)$$

where j is the index corresponding to the time beat immediately preceding t, such that $t(j) \leq t \leq t(j+1)$.

Thus, each time that the index i is aligned with the index j (whether it is an automatic or manual resetting), at time instant $t = t(j)$, one gets:

$$Z_P^{}(t(j)) = Z_{GPS}(t(j)) - \Delta Z^{}(j)$$
$$= Z_{GPS}(t(j)) - [Z_{GPS}(t(j)) - Z_P(t(j))]$$
$$= Z_P(t(j)),$$

Thus, as long as the sensor measurements are considered to be reliable and in the absence of corruption of the pressure altitude, or when the pilot activates the reset—restart command, the reconstituted pressure altitude $Z_P^{**}$ is indeed reset to that of the pressure altitude $Z_P$. It is therefore a "loose" hybridisation in the sense that the typical time interval between two resets is DT (30 seconds in the example chosen).

The pressure altitude estimator $Z_P^{}$ therefore enables the possibility of providing in a continuous ongoing manner an estimated value of the static pressure surrounding the aircraft (via a standard atmosphere table), while being protected against sudden corruption of the static pressure probe 5a: for example, a freezing of the static pressure is detected very rapidly after setting the aircraft controls to begin climbing or descending, through the exceeding of the tolerance threshold ST and the rapid divergence between the altitudes $Z_P^{}$ and $Z_P$.

Moreover, when an inconsistency between the air data, clino-barometric parameters derived from the sensors is detected, stopping of the automatic resetting ensures that the doubtful static pressure and total pressure values are no longer taken into account; indeed, the malfunctioning of pressure sensors, whether for static or total pressure, has a direct impact on the reliability of the pressure altitude computed by the computer 3.

The pressure altitude derived from the GPS sensor is displayed by the auxiliary display device 14 when the static and total pressure values are considered to be unreliable. The pilot can then choose to display either the altitude above the reference geoid $Z_{GPS}$ (it then involves a "GEO" setting of altitude above the reference geoid) or the reconstituted pressure altitude $Z_P^{**}$ (it then involves a "Standard" setting of altitude).

Stopping the automatic resetting of $\Delta Z^{}$ on account of at least one of the two stop conditions described here above could be detrimental, in the long term, to the accuracy of the reconstituted pressure altitude $Z_P^{}$. The reset command provides the possibility of avoiding such inaccuracy and restarting the automatic resetting, when the pilot has available information that allows them to authenticate the validity of the static pressure measurements.

However, if no information available on board serves to authenticate the validity of these static pressure measurements, the GPS altitude of the aircraft 1 above the geoid and the static pressure surrounding the aircraft 1 are evaluated in accordance with a secondary mode, based on the local QNH (Queen's Nautical Height). QNH is an international code that is used for the setting of the altimeter such that it indicates the topographic elevation of the land area where the QNH is deduced when the aircraft is located on the ground in this land area.

The local QNH, obtained on an ad hoc basis through meteorological forecasting, or by way of radio communication or datalink means, is then inserted into the secondary mode by the pilot, and the computer 3 extracts the theoretical static pressure $P_{st}$ from a standard atmosphere table, corresponding to a pressure altitude situated at an altitude $Z_{GPS}$ above the isobar of the QNH.

In this secondary mode, the reconstituted static pressure $P_S^{**}$ is equal to the theoretical static pressure $P_{st}$. It should be noted that the closer that the plane flies to the ground surface or the sea surface, the better will be this estimate of the static pressure.

Advantageously, entry into this secondary mode for reconstitution of the static pressure can be done by pressing on the same command as the $\Delta Z^{**}$ reset command in the primary mode. The duplexing of this command may be carried out implicitly by the display of an altimeter setting by the pilot on the auxiliary display device 14: if the requested setting is "standard", the actuation of the reset command will restart the process of automatic resetting in accordance with the primary mode; if it is a manual type setting (QNH displayed), typically below the transition surface, the reset command will activate the secondary mode for reconstitution of the static pressure.

The first auxiliary speed of the aircraft 1 determined during the phase 49 is independent of the static pressure $P_S$ derived from the static pressure sensor 5a. It is advantageously extrapolated in real time from the current value of the measured angle-of-attack. This speed is for example a Mach number, known as high Mach and denoted by $M^*_n$.

This Mach number is determined periodically from the equation of lift, in the form of a recursive series, in accordance with the relationship:

$$M_n^* = \left( \frac{0.7S \cdot P_S^{**} \cdot \tilde{C}_z^*(t_v)}{n_z \tilde{m} g} \right)^{-\frac{1}{2}} \quad (21)$$

where:
N is a time index corresponding to a time instant $t_v$,
$P_S^{**}$ is the reconstituted static pressure determined during the phase 47 at time instant $t_v$,
$n_Z$ is the load factor determined during the phase 33 at time instant $t_v$,
$\tilde{m}$ is the weight estimated during the phase 39 at time instant $t_v$, and
$\tilde{C}^*_Z(t_v) = \tilde{C}_Z(\alpha(t_v), M^*_{n-1}, \text{conf})$ is a coefficient of lift is estimated at time instant $t_v$ The estimated coefficient of lift $\tilde{C}^*_Z(t_v)$ is determined from a correlation lookup table, providing the value of $\tilde{C}^*_Z(t_v)$ based on the value of the angle-of-attack $\alpha$ at time instant $t_v$ determined during the phase 31, and on the last high Mach determined, that is to say the high Mach $M^*_{n-1}$ with index n−1.

This estimated coefficient of lift $\tilde{C}^*_Z(t_v)$ thus differs from the coefficient of lift $\tilde{C}_Z$ determined during the phase 33 in that it does not involve the Mach number derived from the Mach indicator 8 based on the static pressure measured by the static pressure sensor 5a and the total pressure measured by the total pressure sensor 5b. The high Mach $M^*_n$ therefore does not depend on the pressures measured at time instant $t_v$.

The series $M^*_n$ is initialised based on a first term $M^*_1$. This first term is a reliable initial value, derived from independent measurements made by the pressure sensors.

The frequency for determination of the high Mach is for example comprised between 1 Hz and 10 Hz, preferably 4 Hz.

However, the high Mach depends on the angle-of-attack $\alpha$. In case of a detected failure of the angle-of-attack sensor 5d, this speed $M^*_n$ is no longer calculated.

The Vhigh Mach $M^*_n$ thus calculated may be used to derive an estimate of static temperature $SAT^*_n$ independently of the pressure measurements originating from the sensors 5a or 5b, a standard temperature deviation estimator $\Delta/SA^*_n$, estimating the variation in temperature $SAT^*_n$ relative to the static temperature $SAT_{std}$ expected at the reconstituted pressure altitude $Z_P^{**}$ of the aircraft, and an estimate of the horizontal wind speed.

The static temperature $SAT^*_n$ is obtained during the phase 50 based on the total temperature TAT derived from the sensor 5c, supposed to be reliable, and the strong Mach $M^*_n$, by replacing the Mach number M in equation (1) by the high Mach $M^*_n$ in accordance with the following expression:

$$SAT^*_n = \frac{TAT(t_v)}{\left(1 + \frac{\gamma-1}{2}M^{*2}_n\right)} \approx \frac{TAT(t_v)}{(1 + 0.2M^{*2}_n)} \quad (22)$$

The standard temperature deviation estimator $\Delta/SA^*_n$, estimating the variation in temperature $SAT^*_n$ relative to the static temperature $SAT_{std}$ expected at the reconstituted GPS pressure altitude $Z_P^{**}$ of the aircraft, is determined by the expression:

$$\Delta/SA^*_n = SAT_{std} - SAT^*_n \quad (23)$$

the temperature $SAT_{std}$ being for example determined from a standard atmosphere table. This standard temperature deviation estimator is not used as long as the angle-of-attack measured by the angle-of-attack sensor 5d is considered to be reliable and the Vhigh Mach can be calculated. However, it provides the ability, when this angle-of-attack is no longer considered to be reliable, to estimate a static temperature by correcting a static temperature $SAT_{std}$ obtained from the GPS altitude pressure $Z_P^{**}$, as described here below.

The horizontal wind speed relative to the ground is determined during the phase 51 by means of a horizontal wind estimator $\vec{W}^*_n$ that periodically assesses wind speed in terms of strength and direction. This wind estimator is advantageously determined from the velocity triangle according to which the speed $\vec{V}_S$ of the aircraft relative to the ground, in a horizontal plane, is the sum of its air speed $\vec{V}_P$ and the speed of the wind, which is:

$$\vec{W}^*_n = \vec{V}_S - \vec{V}_P \quad (24)$$

The horizontal speed $\vec{V}_S$ of the aircraft relative to the ground, that is to say, its speed in a plane horizontal to the ground, is estimated from measurements made by the GPS sensor 10 for example. Thus $\vec{V}_S = \vec{GS}$.

The air speed $\vec{V}_P$ of the aircraft is the horizontal component of its speed relative to the air, that is to say, the horizontal component of its true air speed.

A true air speed of the aircraft, known as high true air speed and denoted by $TAS^*_n$, is determined from the high/high Mach $M^*_n$, according to a relationship that is analogous to the relationship (5):

$$TAS^*_n = M^*_n \sqrt{\gamma R \cdot SAT^*_n} \quad (25)$$

Neglecting the vertical component of the wind speed, the speed of the aircraft 1 along the vertical axis B relative to the ground is equal to its vertical speed with relative to the air.

Thus, a standard value of the air speed, known as high air speed and denoted by $V^*_p$, is determined from the high true air speed in accordance with the relationship:

$$TAS^{*2}_n = V^{*2}_p + V_Z(GPS)^2 \quad (26)$$

where $V_Z(GPS)$ is the speed of the aircraft 1 along the vertical axis B relative to the ground, as determined from measurements made by the GPS sensor 10 for example.

The air speed $\vec{V8}_p$ of the aircraft is therefore estimated by:

$$\vec{V}^*_p = \vec{u}_h \sqrt{TAS^{*2}_n - V_Z(GPS)^2} \quad (27)$$

wherein the vector $\vec{u}_h$ is a horizontal unit vector bearing the horizontal projection of the velocity vector relative to the air, estimated by means of the angle-of-attack $\alpha$.

Based on the assumption according to which the side slip (i.e., the angle between the relative wind and the aircraft heading) is zero and the angle-of-attack $\alpha$ of the aircraft given by the angle-of-attack sensor 5d is reliable, the horizontal wind estimator $\vec{W}^*_n$ is thus determined from the expression:

$$\vec{W}^*_n = \vec{GS} - \vec{u}_h \sqrt{M^{*2}_n \cdot (\gamma R SAT^*_n) - V_Z(GPS)^2} \quad (28)$$

During the flight of the aircraft 1, the computer 3 implements several tests that provide the ability to determine a status of credibility of the values of flight parameters determined by means of sensor measurements. In particular, these tests are used to determine the consistency of the data and information relating to speed, pressure and angle-of-attack, such as the Mach number $M_a$, the static pressure Ps and the angle-of-attack $\alpha$.

The method thus comprises a step 70 of determination of a state of credibility of the information and data values relating to static pressure, total pressure and angle-of-attack, by means of a first test. This test 70 is an analytical surveillance test, implemented continuously during the flight, until a malfunction has been detected.

The test 70 is based on the equation of lift. It is carried out by determining whether the flight parameters measured actually satisfy this equation of lift. This equation in fact brings to bear the static pressure Ps, the Mach number $M_a$ and the angle-of-attack $\alpha$, via the coefficient of lift at the aircraft axes $\tilde{C}_Z$.

The test 70 comprises a phase 72 of determination of the quantity:

$$T_1(t^k_v) = \frac{n_z(t_v + \varphi)\tilde{m}(t_v)g}{0.7 SP_S(t_v) M^2_a(t_v) \tilde{C}_Z(\alpha(t_v), M_a(t_v), conf)} \quad (29)$$

in which the parameters, $\tilde{m}$, $P_S$, $M_a$, $\tilde{C}_Z$ are those determined during the step 28 at a time instant $t_v$ immediately prior to the time instant $t^k_v$ of determination 72. The index k indicates that it is the $k^{-th}$ test 70 being implemented by the computer 3. $n_Z$ is determined at a time instant $(t_v+\varphi)$ where $\varphi$ is a time offset determined once and for all in all or part of the flight envelope, in order to statistically maximise a correlation between the angle-of-attack $\alpha(t_v)$ and the load factor $n_Z(t_v+\varphi)$ on the aircraft considered, as described subsequently.

The equation of lift holds if $T_1=1$ in the absence of any error in the measurements and in the variance distribution $\tilde{C}_Z$. Thus, if the values of the static pressure $P_S$, the Mach number $M_a$ and the angle-of-attack $\alpha$ derived from measurements made by sensors are correct and if the variance distribution $\tilde{C}_Z$ is correct, the quantity $T_1$ must be equal to 1.

A slight deviation from this value may nevertheless still be tolerated, particularly because of the noise of the measurements, the deviation of the estimated weight $\tilde{m}$ relative to the actual weight of the aircraft, and the potential inaccuracy of the value of the coefficient of lift $\tilde{C}_Z$.

The test 70 thus includes a step 73 in which the computer 3 verifies the inclusion of the value $T_1$ in a limited interval around the value 1, denoted by $]1-\in_1;1+\in_1[$. $\in_1$ is a predetermined number defining the permissible deviation, for example 0.1, corresponding to a 10% error.

If $T_1 \in ]1-\in_1;1+\in_1[$, the first test 70 is positive, and the data values for speed, pressure and angle-of-attack are considered to be of optimal credibility 74.

In the state of optimal credibility 74, the flight parameters used directly or indirectly for the operation and control of the aircraft thus are:

pressure altitude $Z_P$;
static temperature SAT;
the Mach number $M_a$;
the true air speed TAS;
the indicated air speed IAS.

The true air speed of the aircraft is determined from the Mach number $M_a$ in accordance with the relationship:

$$TAS = M_a \sqrt{\gamma R \cdot SAT} \quad (30)$$

The indicated air speed of the aircraft, denoted by IAS for "Indicated Air Speed" is the speed directly derived from the pressure measurements, translated by the anemometer 7.

During a long phase of stabilised flight, the function p(t) converges to the value 1, so that the estimated weight $\tilde{m}(t)$ converges to the weight $m_{sp}(t)-FU(t)$, which itself converges to the weight $m_4(t)$ derived from the equation of lift. Thus, the quantity $T_1(t_v^k)$ naturally converges to the value 1 during a flight stabilised in cruise phase. This is obtained even if the variance distribution $\tilde{C}_Z$ has a bias or if the measurement of angle-of-attack sensor is biased.

In the state of optimal credibility 74, the auxiliary display device 14 displays a set of flight characteristics derived from measurements made by sensors of the aircraft 1, determined in particular from the static pressure, total pressure and the angle-of-attack measured. For example, the auxiliary display device 14 displays the pressure altitude $Z_P$, the Mach number $M_a$ and the indicated air speed IAS. The auxiliary display device 14 also displays the flight path angle $\gamma_{air}$ and the angle-of-attack $\alpha$ measured.

The auxiliary display device 14 further displays indicated stall speed of the aircraft 1, denoted by $IAS_s$, on the basis of the current load factor $n_z$. It is therefore the minimum IAS speed that can be reached by the aircraft 1 without stalling at the value of the current load factor.

This stall speed $IAS_s$ is determined by the computer 3 as a function of the current angle-of-attack $\alpha_S$ of stall, the indicated air speed IAS and angle-of-attack $\alpha$, in accordance with the equation:

$$IAS_s = IAS \sqrt{\frac{\alpha - \alpha_0}{\alpha_S - \alpha}} \quad (31)$$

where $\alpha_0$ is the angle-of-attack of zero lift in the current configuration of the aircraft. It is generally negative, its absolute value may go up a few degrees to the highest flap setting. This angle-of-attack $\alpha_0$ is tabulated depending on the configuration of the aircraft.

If on the contrary $T_1 \notin ]1-\in_1;1+\in_1[$, $T_1$ corresponding to a time instant $t_v^{k1}$, the test 70 is negative, which signifies that at least one of the data values of static pressure, total pressure, or angle-of-attack is wrong. The computer 3 then considers that the measurements of speed, barometric altitude and angle-of-attack are no longer reliable, and activates in a transition step 75 a state of low credibility 76.

As long as this state of low credibility 76 is activated, the flight parameters determined by the computer 3 at a time instant $t_v$ and intended to aid in flight operation and control are independent of the values for static pressure, total pressure and angle-of-attack derived from the sensors at this time instant $t_v$, even if they may depend on previous values measured in the state of optimal credibility.

During the transition step 75, the computer 3 freezes the values of the standard temperature deviation $\Delta/SA^*_n$ and the pressure altitude offset $\Delta Z^{**}(j)$ at the last known reliable values. The last known reliable values are those determined some time prior to the previous test 70, at a time instant denoted by $t_f$; $t_f$ is the most recent time instant at which the flight parameters were considered to be reliable. For example $t_f = t_v^{k1} - 30$ s would be chosen.

In particular, the total temperature measurement TAT made by the total temperature sensor 5c is considered to be unreliable, such that the resetting of the standard temperature deviation $\Delta/SA^*_n$ based on the relationships (23) and (24) cannot be performed. The standard temperature deviation $\Delta/SA^*_n$ thus takes the constant value $\Delta/SA^{**}_{tf} = \Delta/SA^*_n(t_f)$.

The static temperature is then estimated from the reconstituted pressure altitude $Z_P^{**}$ in accordance with the relationship:

$$SAT^{} = SAT_{std}(Z^{}_p) + \Delta/SA^{**}_{tf} \quad (32)$$

$SAT^{**}$ is known as low static temperature.

As for the static temperature $SAT^*_n$, it is no longer determined.

The pressure altitude offset $\Delta Z^{}(j)$, used for the determination 47 of the reconstituted pressure altitude $Z_P^{}$, moreover also takes the constant value $\Delta Z^{**}_{tf} = \Delta Z(t_f)$ (the value of i is frozen as described here above).

However, as previously described above, this value $\Delta Z^{**}_{tf}$ may be modified at any time by manual action performed by the pilot in activating the reset command, for example, at low altitude before landing if the pilot verifies that their pneumatic altitude indicated at the QNH setting is consistent with their geoid altitude given by a standby backup instrument or their radiosonde unit height increased by the terrain elevation.

Furthermore, the angle-of-attack value is not reliable, such that the wind estimator can no longer be determined according to the equation (29) given here above. This estimator thus denoted by $\vec{W}^{}$, then takes a constant value $\vec{W}^{}_{tf} = \vec{W}^*_n(t_f)$. However, the value of the wind estimator may be updated occasionally, in an automatic manner, when the trajectory of the aircraft undergoes sufficient change, according to a criterion described here after.

The updating or resetting of the low credibility horizontal wind estimator $\vec{W}^{**}$ is performed according to a method similar to the method for determining the high credibility horizontal wind estimator $\vec{W}^*_n$, by replacing the angle-of-attack $\alpha$ measured by the angle-of-attack sensor with a reconstituted angle-of-attack denoted by $\alpha_R$, and replacing the high true air speed $TAS^*_n$ with an estimated true air speed denoted by $T\tilde{A}S$.

Evaluation of the reconstituted angle-of-attack $\alpha_R$ is performed based on the equation of lift of the aircraft, by remaining within a flight envelope in which the coefficient of lift of the aircraft can be expressed as a linear function of the angle-of-attack $\alpha_R$, whose coefficients are predetermined in accordance with the expression:

$$\tilde{C}_Z(\alpha_R, M) = \lambda(M) \cdot \alpha_R \qquad (33)$$

valid within a limited angle-of-attack range $[\alpha_0(M), \alpha_1(M)]$.

Thus, the reconstituted angle-of-attack is given by:

$$\alpha_R = \frac{\tilde{C}_z - \lambda(M)}{\mu(M)} = \frac{n_z \tilde{m} g}{0.7 S P_S^{} M^{2} \mu(M)} - \frac{\lambda(M)}{\mu(M)} \qquad (34)$$

In similar fashion, the derivative of the reconstituted angle-of-attack $\alpha_R$ is expressed as a function of the derivative of the load factor $n_Z$, by:

$$\dot{\alpha}_R = \frac{\tilde{m} g}{0.7 S P_S^{} M^{2} \mu(M)} \dot{n}_Z \qquad (35)$$

The values of $\lambda(M)$ and $\mu(M)$ are determined from tables giving the value of the coefficient of lift as a function of the angle-of-attack and the Mach number.

The estimated true air speed $\tilde{TAS}$ is then estimated as a quotient between an acceleration of the aircraft and an angular speed of this aircraft, on the basis of the reconstituted angle-of-attack $\alpha_R$ and its derivative. This estimate is valid provided that the change in flight path trajectory of the aircraft is sufficiently well defined, according to the criteria described here below, and assuming that the side slip is zero.

The criterion used to assess whether the change in flight path trajectory is sufficient is based on the following formula which expresses, by way of the fundamental relationship of the dynamic, that the projection of the acceleration of the airplane in the terrestrial reference frame, projected in the plane of the aircraft, is greater than a determined value, advantageously 0.4 g:

$$\|g \vec{n} + \vec{g}\| > 0.40 \, g \qquad (36)$$

where $\vec{n}$ is the load factor and $g\vec{n} + \vec{g}$ the acceleration of the aircraft.

Thus, the change in the trajectory of the aircraft is considered adequate if:

$$(\cos \theta \sin \varphi_1)^2 + (n_Z - \cos \varphi_1 \cos \theta)^2 > 0.16 \qquad (37)$$

where $\delta$ denotes the pitch angle of the aircraft and $\varphi_1$ the angle of heel thereof.

It should be noted in particular that it suffices to have $(\cos \theta \sin \varphi_1)^2 > 0.16$, therefore to sufficiently tilt the airplane (whatever be the thrust, the drag and the lift) in order to obtain a "sufficient" change in flight path trajectory.

Typically, when the aircraft 1 in terms of trajectory is close to the straight line flight path, the calculation of the estimated true air speed will be declared invalid and the horizontal wind estimator $\vec{W^{**}}$ will not be updated.

Conversely, when the change in the flight path trajectory is considered sufficient, the estimated true air speed $\tilde{TAS}$ is estimated, which allows for resetting the horizontal wind estimator in $\vec{W^{**}}$ accordance with the expression:

$$\vec{W^{**}} = \vec{GS} - \vec{v}_h \sqrt{\tilde{TAS}^2 - V_Z(GPS)^2} \qquad (38)$$

where $\vec{v}_h$ is a horizontal unit vector bearing the horizontal projection of the air speed vector estimated by means of the reconstituted angle-of-attack $\alpha_R$.

During the transition step 75, the computer 3 moreover also fixes $\chi_m(t) = 0$, such that the values of static pressure, Mach and angle-of-attack are no longer used to calculate the estimated weight. Thus, the estimated weight $\tilde{m}$ at a time instant $t_v > t_f$ is given by:

$$\tilde{m}(t_v) = \tilde{m}(t_f) - FU[t_f; t_v] \qquad (39)$$

where $FU[t_f; t_v]$ denotes the weight of fuel consumed between $t_f$ and $t_v$.

Estimation of the horizontal wind speed and standard temperature deviation provides the ability, in addition to the reconstituted pressure altitude $Z_p^{}$, to calculate estimates of speed of the aircraft 1 based on its speed $\vec{GS}$ relative to the ground. These estimates are for example an estimate of the Mach number of the aircraft, known as low Mach and denoted by $M^{}$, and an estimate of a speed equivalent, known as low speed equivalent and denoted by $EV^{**}$.

The speed $\vec{GS}$ of the aircraft 1 relative to the ground is determined for example by the computer 3 from the GPS sensor 10. It can also be determined from the acceleration of the aircraft as measured by the inertial systems IRS (Inertial Reference System) of the aircraft 1, optionally eventually hybridising the information and data values received from the GPS sensor and inertial systems.

The speed $\vec{GS}$ of the aircraft 1 and the estimate of the horizontal wind $\vec{W^{}}$ speed, equal to the frozen value $\vec{W^{}}_{t_f}$ or to a reset value, may be used to determine an air speed vector of the aircraft, known as low air speed and denoted by $\vec{V^{**}}_P$ and given by:

$$\vec{V^{}}_P = \vec{GS} - \vec{W^{}} \qquad (40)$$

The vertical speed $V_Z(GPS)$ of the aircraft 1 along the vertical axis B relative to air is determined from measurements made by the GPS sensor 10, and overlooking the vertical wind.

A true air speed of the aircraft, known as low true air speed and denoted by $TAS^{**}$, is then determined as a standard of the velocity vector of the aircraft relative to the air, the sum of the air speed and the vertical speed in accordance with the relationship:

$$TAS^{}(t) = \|\vec{GS} + V_Z(GPS)\vec{k} - \vec{W^{}}\| \qquad (41)$$

in which:

$\vec{GS}$ is the horizontal speed of the aircraft 1 relative to the ground at the time instant t;

$V_Z(GPS)$ denotes the speed of the aircraft 1 along the vertical axis B at the time instant t;

$\vec{k}$ is an ascending unit vector parallel to the vertical axis B;

$\vec{W^{**}}$ is the wind estimator that is frozen or reset.

Based on the estimated pressure altitude $Z^{}_p$, and on the frozen standard temperature deviation $\Delta/SA^{}_{t_f}$ the surrounding static temperature $SAT^{} = SAT_{std}(Z^{}_p) + \Delta/SA^{}_{t_f}$ and the estimated speed of sound $\sqrt{\gamma R \cdot SAT^{}}$ are also estimated.

The low Mach $M^{**}$ is then determined from the low true air speed and the estimated speed of sound, by means of the relationship:

$$M^{}(t > t_f) = \frac{TAS^{}(t)}{\sqrt{\gamma R \cdot SAT^{**}}} \tag{42}$$

that is to say, $$M^{}(t > t_f) = \frac{\|\vec{GS} + V_Z(GPS)\vec{k} - \vec{W}_{tf}^{}\|}{\sqrt{\gamma R \cdot SAT^{**}}} \tag{43}$$

The low Mach M** is thus independent of any pressure value measured after time instant $t_f$. The periodic calculation of the high Mach $M^*_n$ is interrupted, because this calculation depends on the angle-of-attack α.

Furthermore, a low speed equivalent, denoted by EV, is determined from the low Mach M and the reconstituted pressure altitude $Z^{**}_P$ in accordance with the relationship:

$$\frac{1}{2}\rho_0 EV^{2} = \frac{1}{2}\gamma P_S^{} M^{**2} \tag{44}$$

The low speed equivalent EV is thus obtained from the low Mach M and the reconstituted static pressure $P^{**}_S$ by means of the relationship:

$$EV^{} = \sqrt{\frac{\gamma P_S^{}}{\rho_0}} M^{**},$$

the reconstituted static pressure $P^{**}_S$ itself being determined from the reconstituted pressure altitude $Z_P$ based on a standard atmosphere table.

In the state of low credibility 76, the flight parameters used directly or indirectly for the flight operation and control of the aircraft, at a time instant $t_v$, thus are as follows:

the GPS pressure altitude $Z^{}_P = Z_{GPS} - \Delta Z^{}_{tf}$;
the static temperature $SAT = SAT_{std}(Z^{}_P) + \Delta SA^{}_{tf}$;
the horizontal wind estimator $\vec{W}^{}$ frozen at the value $\vec{W}^{}_{tf}$ or reset;
the low Mach M**;
the low true air speed TAS**;
the low speed equivalent EV**.

Thus, in low credibility mode, the only real time measurements used are those derived from the GPS sensor.

In order to refine the test 70 and to segregate the errors relating to the static pressure $P_S$ or the total pressure $P_T$, attributable to a malfunction of sensor probes, from an error relating to the measurement of the angle-of-attack α due to a malfunction of the angle-of-attack sensor 5d, the computer 3 carries out a second test 78. This test 78 is performed following the completion of the test 70, during a limited time period d after the time instant $t_v^{k1}$, of 5 seconds for example.

This second test 78 is meant to be used for determining the credibility of the angle-of-attack α as measured in the phase 31.

This test 78 of angle-of-attack is performed by determining whether the equation of lift holds, by replacing in this equation the static pressure $P_S$ measured by the static pressure sensor 5a and the Mach number $M_a$ determined by the Mach indicator 8 based on measurements made by the static and total pressure sensors, with corresponding auxiliary flight parameters.

These corresponding auxiliary flight parameters are the reconstituted static pressure $P_S^{}$, determined in accordance with the phase 45, and the low Mach M determined during the step 76. Moreover, the coefficient of lift, denoted by $\tilde{C}_Z$, is estimated from the value of the angle-of-attack α at time instant t determined during the phase 31 and the low Mach M**.

The test 78 includes the determination 80 of the ratio $T_2$ satisfying:

$$T_2(t_V^{k1} + d > t_V > t_V^{k1}) = \frac{n_Z(t_V + \phi)\tilde{m}(t_V)g}{0.7 S P_S^* M^{2}(t_V)\tilde{C}_Z^{}(t_V)} \tag{45}$$

where $\tilde{C}^{}_Z(t_v) = \tilde{C}_Z(\alpha(t_v), M^{}(t_v), conf)$.

This step 80 is followed by a step 82 during which the computer 3 verifies the inclusion of $T_2$, in the interval $]1-\epsilon_2; 1+\epsilon_2[$ where $\epsilon_2$ is a predetermined tolerance parameter, for example equal to $\epsilon_1$.

The ratio $T_2$ does not depend on the static pressure and the Mach number measured. Thus, a deviation of $T_2$ from the expected theoretical value 1 specifically incriminates the measurement of angle-of-attack α, because it is the only measurement subsequent to $t_v^{k1}$ other than the measurements derived from the GPS sensors, which for their part are assumed to be reliable. If $T_2 \notin ]1-\epsilon_2; 1+\epsilon_2[$, the computer 3 identifies a failure of the angle-of-attack sensor 5d, not excluding a failure of pressure sensors. The computer 3 thus maintains the state of low credibility 76.

The auxiliary display device 14 then displays the auxiliary flight characteristics not requiring involvement of the measurements derived from the pressure sensors 5a, 5b and the angle-of-attack sensor 5d, these measurements being considered to be unreliable. Thus, each of the flight characteristics requiring involvement of one of these measurements in the state of optimal credibility is replaced by a homologous characteristic, i.e., one representative of the same flight characteristic, on the auxiliary display device 14.

For example, the pressure altitude $Z_P$, the Mach number $M_a$ and the indicated air speed IAS are replaced on the auxiliary display device 14 by homologous characteristics, which are respectively the reconstituted pressure altitude $Z^{}_P$ or the altitude $Z_{GPS}$, depending on the choice of the pilot, the low Mach number M, and the low speed equivalent EV.**

In addition, the flight path angle $\gamma_{air}$ and the angle-of-attack α are no longer displayed, and thus disappear from the auxiliary display device 14.

Furthermore, the indicated stall speed $IAS_s$ is replaced by a low stall speed equivalent $EV_S^{}$ on the basis of the current load factor $n_z$. The low stall speed equivalent $EV_S^{}$ is determined by the computer 3 as a function of the current load factor $n_Z$ and a stall speed equivalent $EV_{S0}$ under an acceleration of 1 g, in accordance with the relationship:

$$EV^{**}_S = EV_{S0}\sqrt{n_Z} \tag{46}$$

The stall speed equivalent $EV_{S0}$ is obtained from a stall table depending on the estimated weight $\tilde{m}$ of the aircraft 1. Moreover, the auxiliary display device 14 displays a warning—alert message meant to inform the pilot of the state of low credibility. This message thus indicates to the pilot that the measurements of the pressure sensors and the angle-of-attack sensor are not reliable, and that the speeds displayed by the conventional aircraft instrumentation are probably incorrect.

If on the contrary, $T_2 \in ]1-\epsilon_2; 1+\epsilon_2[$, and subject to the proviso that an additional test assessing dynamic consistency of the angle-of-attack measured with the load factor, detailed here below, has not furnished a negative result for a predetermined time period, for example 5 minutes, the computer 3 excludes a case of failure of the angle-of-attack sensor 5d which implies a failure of at least one of the static and total pressure sensors. The computer 3 thus lifts the state of low credibility, and activates in a step 83 a state of high credibility 84.

During the transition 83, the auxiliary display device 14 displays a warning—alert message meant to inform the pilot of the state of high credibility. This message indicates that the measurements of the pressure sensors are not reliable, and that the speeds displayed by the conventional aircraft instrumentation are probably incorrect.

In this state of high credibility 84, the flight parameters determined at a time instant t are independent of the values of static and total pressure derived from sensors at this time instant $t_v$, but may depend on the angle-of-attack reading derived from the angle-of-attack sensor 5d.

During the transition 83 from a state of low credibility 76 to a state of high credibility 84, the computer 3 reinitialises the calculation of the sequence of high Machs, interrupted in the state of low credibility, based on an initial term $M^*_1$ corresponding to the last value of the low Mach number before the transition 83. The initial term $M^*_1$ is thus updated each time that the state of high credibility 84 is activated.

The static temperature $SAT^*_n$ is once again evaluated in accordance with the expression:

$$SAT^*_n = \frac{TAT(t_V)}{(1 + 0.2 M^{*2}_n)} \quad (47)$$

In addition, the computer 3 resumes the determination of the standard temperature deviation estimator $\Delta/SA^*_n$, suspended in the state of low credibility on account of the unavailability of the high Mach number $M^*_n$. This estimator is determined in accordance with the step 50 described above.

The calculator 3 also resumes the calculation of the wind estimator $\vec{W}^*_n$, periodically assessing the wind speed relative to the ground, in accordance with the phase 51 here above. This calculation does indeed call for the high Mach number and the high static temperature $SAT^*_n$, which are once again available.

The high true air speed $TAS^*_n$ is determined based on the high Mach number $M^*_n$ and the static temperature $SAT^*_n$ in accordance with the expression (23) here above.

In addition, a high speed equivalent, denoted by $EV^*_n$, is determined from the high Mach number $M^*_n$ and the reconstituted pressure altitude $Z^{**}_P$ in accordance with the relationship:

$$\frac{1}{2} \rho_0 EV^{*2}_n = \frac{1}{2} \gamma P^{**}_S M^{*2}_n \quad (48)$$

Thus, the flight parameters used directly or indirectly for the flight operation and control of the aircraft 1 in high credibility mode are as follows:
the GPS pressure altitude $Z^{}_P = Z_{GPS} - \Delta Z^{}_{tf}$;
the static temperature $SAT^*_n$;
the measured angle-of-attack $\alpha$;
the high Mach $M^*_n$;
the high true air speed $TAS^*_n$;
the high speed equivalent $EV^*_n$.

In the high credibility state 84, the auxiliary display device 14 displays the auxiliary flight characteristics not requiring involvement of the measurements derived from the pressure sensors. Thus, each of the flight characteristics requiring involvement of a measurement made by a pressure sensor in the state of optimal credibility is replaced by a homologous characteristic on the auxiliary display device 14, independent of any measurement made by pressure sensors in the state of high credibility.

For example, the pressure altitude $Z_P$ is replaced on the auxiliary display device 14 by a homologous characteristic, which is the reconstituted pressure altitude $Z^{**}_P$ or the altitude $Z_{GPS}$, depending on the choice of the pilot. The Mach number $M_a$ is replaced by the high Mach number $M^*_n$ and the indicated air speed IAS is replaced by the high speed equivalent $EV^*_n$.

The flight path angle $\gamma_{air}$ and the angle-of-attack $\alpha$ continue to be displayed.

The auxiliary display device 14 displays in addition, a high stall speed equivalent denoted by $EV^*_S$, determined by the computer 3 in an analogous manner to the indicated stall speed $IAS_S$, based on the high speed equivalent $EV^*_n$, the current stall angle-of-attack $\alpha_S$ and angle-of-attack $\alpha$, in accordance with the relationship:

$$EV^*_S = EV^*_n \sqrt{\frac{\alpha - \alpha_0}{\alpha_S - \alpha_0}} \quad (49)$$

The determination of these flight characteristics and the ambient air thus make it possible to provide data and information to the pilot of the aircraft while eliminating reliance on static and total pressure measurements that may potentially have been erroneously made by the sensors.

As previously described, in the state of high credibility, the total temperature measured by the sensor 5c and the angle-of-attack measured by the sensor 5d are considered to be reliable, which provides the ability, by way of calculating the reconstituted pressure altitude $Z^{**}_P$, to determine a Mach number (high Mach number) and a true air speed (high true air speed) of the aircraft. These speed data values may be used to determine an image of the atmosphere, and in particular a horizontal wind estimator and a standard temperature deviation estimator.

Conversely, in the state of low credibility, the total temperature measured by the sensor 5c and angle-of-attack measured by the sensor 5d are considered to be unreliable. The reconstituted pressure altitude $Z^{}_P$, the horizontal wind estimator and the standard temperature deviation estimator are then frozen at the latest known reliable values, it being however possible for the reconstituted pressure altitude $Z^{}_P$ and the horizontal wind estimator to be reset. In addition, the frozen value of the standard temperature deviation $\Delta/SA^*_n$ (as determined in the state of high credibility) may be used for estimating a static temperature from the reconstituted pressure altitude $Z^{**}_P$. The knowledge of this simplified image of the atmosphere then provides the ability to determine a Mach number (low Mach) and a speed equivalent (low speed equivalent) of the aircraft.

Whatever be the state of high or low credibility effectively prevalent in the system, the computer 3 implements additional tests in order to assess, in a periodic manner, the credibility of data and information provided by the pressure sensors and/or the angle-of-attack sensor; to detect any eventual changes in this credibility status; and to confirm or modify a state of low or high credibility.

In the state of low credibility 76, the measurements deriving from the pressure sensors 5a and 5b and angle-of-attack sensor 5d are considered to be unreliable. In order to reassess the credibility of these measurements, the computer 3 evaluates the reliability of the measurement of angle-of-attack $\alpha$ in a repeated manner.

If this measurement is considered to be unreliable, the computer 3 maintains the state of low credibility.

If on the contrary, this measurement is considered to be reliable, the computer 3 lifts the state of low credibility, and activates a state of high credibility 84, in which only the pressure measurements are considered to be unreliable.

In the state of high credibility 84, the measurements deriving from the pressure sensors 5a, 5b are considered to be unreliable, while the measurements of the angle-of-attack sensor 5d are believed to be reliable. If the angle-of-attack measurements are considered to be reliable during the assessment by means of additional tests, the computer 3 maintains the state of high credibility 84. If on the contrary the angle-of-attack measurements are considered to be unreliable during the assessment by means of additional tests, the computer 3 activates the state of low credibility 76.

Figure 4:
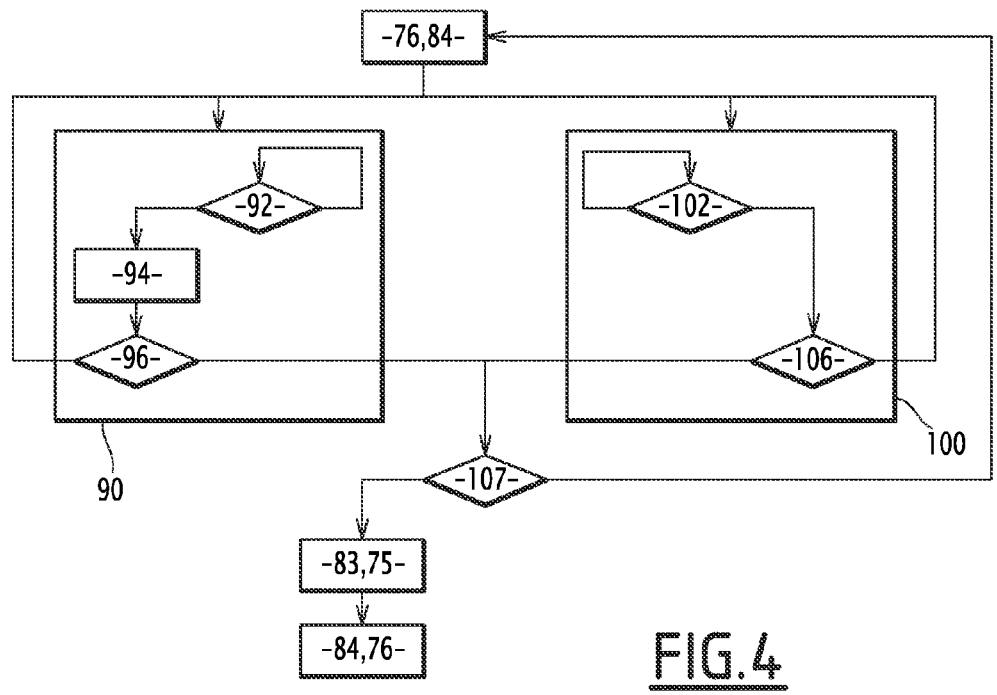
FIG. 4 is a block diagram illustrating the steps to be implemented in order to assess the reliability of angle-of-attack measurements according to one embodiment.

The steps implemented by the computer 3 in order to assess the reliability of measurements made by the angle-of-attack sensor 5d in the state of high 84 or low 76 credibility are illustrated in FIG. 4.

This reassessment is based on two credibility tests of angle-of-attack.

A first test 90 measures the dynamic consistency of the angle-of-attack measured a with the load factor $n_Z$.

A modification of the angle-of-attack $\alpha$ results in a variation of the load factor $n_Z$, with a slight delay denoted by $\varphi$. If one considers a sample of time, during which the angle-of-attack varies by $d\alpha$, that is sufficiently short in order for the values m and $P_S M_a^2 m$ to be regarded as constants, the derivation of the equation of lift over this sample of time gives:

$$dn_Z = \left(\frac{0.7 S P_S M_a^2}{mg}\right)\left(\frac{\partial \tilde{C}_Z}{\partial \alpha}\right) d\alpha \tag{50}$$

If in addition, one considers that the quantity $$\left(\frac{\partial \tilde{C}_Z}{\partial \alpha}\right)$$

is constant over the sample of time, $dn_Z = K \cdot d\alpha$ is obtained, where K is a constant. Consequently, if the value of the angle-of-attack measured by the angle-of-attack sensor 5d is correct, this angle-of-attack must therefore be an affine function of the load factor $n_Z$ over a short sample of time. The test 90, is thus based on the assessment of the covariance between the angle-of-attack and the load factor $n_Z$, measuring the correlation between these two parameters.

The test 90 includes a step 92 of determination of the applicability of the test 90, a step 94 of calculating a correlation coefficient between the load factor and the angle-of-attack, and a step 96 of comparison of this correlation coefficient to a predetermined threshold value.

The test 90 can only be performed if the angle-of-attack and the load factor vary sufficiently over the sample of time considered.

Determination 92 of the applicability of the test 90 includes the assessment of a variance of the load factor $n_Z$, measuring the dispersion of the load factor $n_Z$ around its mean over a selected interval of time, and known as gross empirical energy.

The time interval is for example equal to 2.5 seconds. The gross empirical energy $\in_{n_z}$ of the load factor is given by:

$$\varepsilon_{n_Z}^2 = \frac{1}{100} \sum_{k=1}^{100} \left(n_Z\left(t_0 + \frac{k}{40} + \phi\right) - \overline{n_Z}\right)^2 \tag{51}$$

where $\overline{n_Z}$, the mean of the load factor $n_Z$ over the interval $[t_0+\varphi; t_0+2.5+\varphi]$ is given by:

$$\overline{n_Z} = \frac{1}{100} \sum_{k=1}^{100} n_Z\left(t_0 + \frac{k}{40} + \phi\right) \tag{52}$$

$\varphi$ is the phase shift between the load factor and the angle-of-attack and $t_0$ is a time instant of measurement chosen. $\varphi$ is for example equal to 0.01 second. This phase shift $\varphi$ is dependent on the aircraft type. It is determined once and for all in whole or part for the flight envelope in order to maximise on average, in the part of the flight envelope considered, the correlation between a (t) and $n_Z(t+\varphi)$.

During the step 92, the computer 3 subsequently compares the value of the gross empirical energy $\in_{n_Z}$ of the load factor to a predetermined minimum threshold value $\in_{n_Z\ min}$. The threshold value $\in_{n_Z\ min}$ is for example comprised between 0.01 and 0.02, advantageously equal to 0.015.

If $\in_{n_Z} < \in_{n_Z\ min}$, the test 90 is not continued. In effect, it is then estimated that the angle-of-attack and the load factor do not vary enough over the time interval chosen so as to enable the assessment of their correlation. The computer 3 then repeats the step 92 until the test 90 can be appropriately performed. Alternatively, the test 90 may be continued but the results shall not be taken into account.

If $\in_{n_Z} \geq \in_{n_Z\ min}$, the computer 3 continues the test 90 and proceeds to the step 94.

The step 94 of calculating a correlation coefficient between the load factor and the angle-of-attack includes the calculation of a gross empirical covariance between the angle-of-attack $\alpha$ and the load factor $n_Z$ over a sliding sample of measured values.

The gross empirical covariance $Cov_\varphi(n_Z, \alpha)$ between $n_Z(t+\varphi)$ and $\alpha(t)$ at time instant $t=t_0$ is determined in accordance with the expression:

$$Cov_\phi(n_Z, \alpha) = \frac{1}{100} \sum_{k=1}^{100} \left(n_Z\left(t_0 + \frac{k}{40} + \phi\right) - \overline{n_Z}\right)\left(\alpha\left(t_0 + \frac{k}{40}\right) - \overline{\alpha}\right) \tag{53}$$

where
$$\begin{cases} \overline{n_Z} = \frac{1}{100} \sum_{k=1}^{100} n_Z\left(t_0 + \frac{k}{40} + \phi\right) \\ \overline{\alpha} = \frac{1}{100} \sum_{k=1}^{100} \alpha\left(t_0 + \frac{k}{40}\right) \end{cases}$$

Based on these quantities, the computer 3 during the step 94 determines a gross coefficient of correlation $\text{Corr}_\varphi(n_Z,\alpha)$ between the load factor and the angle-of-attack, in accordance with the expression:

$$\text{Corr}_\phi(n_Z, \alpha) = \frac{\text{Cov}_\phi(n_Z, \alpha)}{\varepsilon_{n_Z}\varepsilon_\alpha} \quad (54)$$

where $\in_a$ denotes the gross empirical energy of the angle-of-attack $\alpha$ in the interval of time $[t_0 \ t_0+2.5]$, given by:

$$\varepsilon_\alpha^2 = \frac{1}{100}\sum_{k=1}^{100}\left(\alpha\left(t_0 + \frac{k}{40}\right) - \overline{\alpha}\right)^2.$$

The coefficient of correlation is by definition comprised in the interval $[-1; +1]$. The closer the value thereof is to 1, the greater is the correlation between the angle-of-attack and the load factor.

The phase shift $\varphi$ is tabulated so as to include a plurality of values depending in particular on the flight envelop considered.

Then, in the step 96, the computer 3 compares the coefficient of correlation determined during the step 94 to a predetermined correlation threshold $\text{Corr}_{min}$.

If $\text{Corr}_\varphi(n_Z,\alpha) < \text{Corr}_{min}$, the test 90 is negative and the angle-of-attack is considered to be unreliable.

If $\text{Corr}_\varphi(n_Z,\alpha) \geq \text{Corr}_{min}$, the test 90 is positive. The temporal variations of the measurements of the angle-of-attack sensor are considered to be reliable.

This test 90 thus provides highly reliable information regarding the vitality of the angle-of-attack and its temporal coherence with the load factor.

However, when this test is positive, a permanent variation between the measured angle-of-attack value and the actual value is not excluded.

Reassessment of the reliability of the angle-of-attack sensor 5d thus includes a second test 100 of angle-of-attack, verifying the consistency between the measured angle-of-attack $\alpha$ and the pitch angle $\theta$ of the aircraft, in straight and level flight.

This test 100 includes a step 102 of determining the relevance of the test 100 and a step 106 of comparing the measured angle-of-attack $\alpha$ and the pitch angle $\theta$ of the aircraft when the test is relevant.

The test 100 may be performed when the aircraft is flying a straight and level path, that is to say when the flight path angle $\gamma_{air}$ of the aircraft and its bank angle $\varphi$ are close to zero. The step 102 thus includes the comparison of the flight path angle $\gamma_{air}$ of the aircraft and its bank angle $\varphi$ to predetermined threshold values.

The flight path angle $\gamma_{air}$ of the aircraft is estimated from measurements derived from the GPS sensor. To this end, the computer 3 determines a vertical speed $\dot{Z}^{}_P$ of the aircraft, derived from the reconstituted pressure altitude, and a Mach number of the aircraft, which may be either the low Mach $M^{}$ in the state of low credibility 76, or the high Mach $M^*_n$ in the state of high credibility 84. The computer 3 then determines the ratio $$Pa = \frac{|\dot{Z}^{}_P|}{M^{}} \text{ or } Pa = \frac{|\dot{Z}^{**}_P|}{M^*_n},$$

proportional to the sine of the flight path angle $\gamma_{air}$, and compares this ratio against a threshold value $P_{max}$. The tolerance is for example equal to 0.4°.

Furthermore, the inertial navigation unit provides to the computer 3 the value of the bank $\varphi$ of the aircraft. The computer 3 then compares this bank angle to a threshold value $\varphi_{max}$, for example equal to 5°.

If $\varphi > \varphi_{max}$ and/or $Pa > P_{max}$ the test 100 is not continued. The computer 3 then repeats the step 102 until the test 100 can be appropriately performed. If $\varphi \leq \varphi_{max}$ and $P \leq P_{max}$, the test 100 may be continued and the computer 3 proceeds to the step 106.

When $\varphi \leq \varphi_{max}$ and $Pa \leq P_{max}$, that is to say when the flight path angle and the bank angle of the aircraft are almost nil, if the vertical wind component were to be disregarded, the pitch angle $\theta$ of the aircraft is substantially equal to its angle-of-attack.

During the step 106, the computer 3 assesses the reliability of the angle-of-attack sensor 5d, by comparing the pitch angle $\theta$, determined by means of the inertial navigation unit, to the angle-of-attack $\alpha$ measured by the angle-of-attack sensor 5d. For example, the computer 3 determines the difference $(\theta - \alpha)$ and verifies that this difference is close to the value 0, that is to say is that it is less than a threshold $\in_3$ in absolute value, where $\in_3$ is a predetermined number defining the deviation permissible. Just as an example $\in_3 = 1°$ could be considered.

If $|\theta - \alpha| > \in_3$, the test 100 is negative. The computer 3 then repeats the step 80 until a positive result has been obtained.

If $|\theta - \alpha| \leq \in_3$, the test 100 is positive.

This test 100 may be used to validate the absolute value of the angle-of-attack in a straight and level flight. It thus allows for eliminating constant errors with respect to the value of the angle-of-attack.

The tests 90 and 100 are repeated on a continuous and ongoing basis by the computer 3.

The two tests 90 and 100 are not always able to provide a result in a concomitant manner. Indeed, the test 90 of correlation between the angle-of-attack and the load factor is applicable when the load factor varies, while the test 100 of comparison between the angle-of-attack and the pitch angle is applicable when the aircraft is in straight and level flight. The positive results for these two tests are not necessarily obtained together.

Thus, when the computer 3 obtains a positive result in one of the tests 90, 100, it activates 107 an intermediate state and stores this result for a predetermined time period $\Delta t$, while awaiting a positive or negative result in the other of these tests 100, 90. The time period $\Delta t$, is for example equal to 5 minutes (300 s).

If a positive result is obtained for the second of these tests 100, 90 during this time period $\Delta t$, the computer 3 considers that measurements of the angle-of-attack sensor 5d are reliable. It is to be noted that if these results are obtained during the interval $[t_v^{ki}, t_v^{ki}+d]$, that is to say, during the time period d after a negative test 70, they are not taken into account.

If the operationally prevalent state of credibility is the state of high credibility 84, the computer maintains this state.

If the operationally prevalent state of credibility is the state of low credibility 76, the computer 3 lifts this state of low credibility and 76 activates the state of high credibility 84, described previously above. In particular, the transition between these two states is similar to the transition 83 described previously above. The permanent test 70 is then reactivated upon entry into high credibility mode.

Moreover, the auxiliary display device 14 displays the auxiliary flight characteristics that are appropriate to this state of high credibility 84. In particular, the GPS pressure altitude $Z^{}_P$ continues to be displayed, but the low Mach number $M^{}$ is replaced by the high Mach number $M^{*}_n$, and the low speed equivalent $EV^{**}$ is replaced by the high speed equivalent $EV^{*}_n$.

In addition, the flight path angle $\gamma_{air}$ and the angle-of-attack $\alpha$ are again displayed by the auxiliary display device. Finally, the high stall speed equivalent $EV^{*}_S$ is again determined from angle-of-attack measurements deriving from the angle-of-attack sensor.

Moreover, the auxiliary display device 14 displays a warning—alert message meant to inform the pilot of the state of high credibility. This message indicates to the pilot that the measurements of the pressure sensors 5a, 5b are not reliable, and that the speeds displayed by the conventional aircraft instrumentation are probably incorrect.

If no positive result is obtained for the second of these tests 100, 90 during the time period $\Delta t$, the computer 3 considers that the measurements of the angle-of-attack sensor 5d are not reliable.

If the operationally prevalent state of credibility is the state of low credibility 76, the computer maintains this state of low credibility 76 and repeats the tests 90 and 100.

If the operationally prevalent state of credibility is the state of high credibility 84, the computer 3 activates the state of low credibility 76.

Notably, during the transition 75 to the state of low credibility 76, the values of the wind estimator $\overrightarrow{W^{*}_n}$, of the standard temperature deviation $\Delta / SA^{*}_n$ and the pressure altitude offset $\Delta Z^{}(j)$ are frozen to the last known reliable values, which are for example those that are determined at a time instant $t_f$ prior to the negative test 90 or 100. The reconstituted pressure altitude $Z_P^{}$ and the horizontal wind estimator may however be reset as described here above.

Moreover, the auxiliary display device 14 displays the auxiliary flight characteristics that are appropriate to this state of low credibility 76. In particular, the GPS pressure altitude $Z_P^{**}$ continues to be displayed, but the high Mach number $M^{*}_n$ is replaced by the low Mach number $M^{**}$, and the high speed equivalent $EV^{*}_n$ is replaced by the low speed equivalent $EV^{**}$.

In addition, the flight path angle $\gamma_{air}$ and the angle-of-attack $\alpha$ are no longer displayed, and disappear from the auxiliary display device 14. Finally, the low stall speed equivalent $EV^{}_S$ is obtained from a stall table based on the current load factor $n_Z$ and a stall speed equivalent $EV_{S0}$ under an acceleration of 1 g. The stall speed equivalent $EV_{S0}$ is obtained from a stall table based on the estimated weight $\hat{m}$ of the aircraft 1**.

Moreover, the auxiliary display device 14 displays a warning—alert message meant to inform the pilot of the state of low credibility. This message indicates to the pilot that the measurements of the pressure and angle-of-attack sensors are not reliable, and that the speeds displayed by the conventional aircraft instrumentation are probably incorrect.

The combination of tests 90 and 100, respectively measuring the correlation between the angle-of-attack and the load factor and the coherence between the angle-of-attack and the pitch angle in level flight, thus ensure the ability to assess the reliability of measurements of angle-of-attack by the angle-of-attack sensor 5d.

As previously described above, the state of low credibility 76 is activated when the first test 70 and the second test 78 successively prove negative.

The state of low credibility 76 is also activated in a systematic manner upon take off, and during each change of configuration of the aircraft 1. After take off, the state of low credibility 76 is lifted and the state high credibility 84 is activated as soon as the "second segment" configuration is reached, subject to the proviso that the test 90 of correlation between the angle-of-attack and the load factor is not negative. In similar fashion, as soon as the change of configuration of the aircraft 1 is completed, the state of low credibility 76 is lifted and the state high credibility 84 is established, subject to the proviso that the test 90 of correlation between the angle-of-attack and the load factor is not negative.

Moreover, in the state of high credibility 84, the computer 3 reassesses the reliability of the pressure sensors 5a, 5b. These tests are implemented in a continuous and ongoing manner in the state of high credibility 84.

Figure 5:
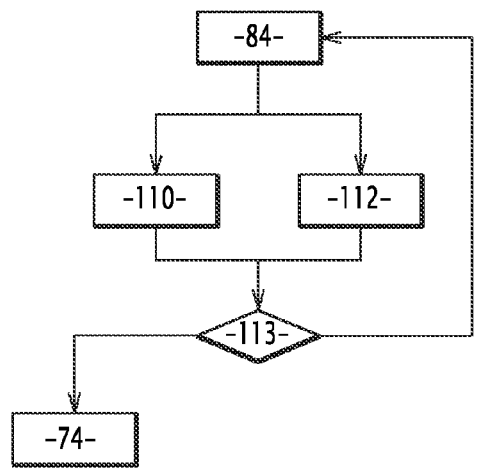
FIG. 5 is a block diagram representing the steps to be implemented in order to assess the reliability of pressure measurements according to one embodiment.

In order to reassess the reliability of the pressure sensors in the state of high credibility, the computer 3 implements two tests 110, 112, as shown in FIG. 5.

In a first test 110 of the pressure sensors, the computer 3 compares the Mach number $M_a$ obtained by the Mach indicator 8 at a given time instant from values of total and static pressure, to the high Mach number $M^{*}_n$ obtained at the same time instant, which does not depend on these pressures. Indeed, if the measured pressure values are correct, these two speeds should be substantially equal.

Thus, during the test 110, the computer 3 determines the Mach number $M_a$ in accordance with the phase 31 here above, and the high Mach number $M^{*}_n$, in accordance with the step 49 above. The computer 3 then determines the ratio $$\frac{M_a}{M^{*}_n},$$

and verifies that this ratio is close to the value 1, that is to say, is comprised within an interval $]1-\epsilon_4; 1+\epsilon_4[$, where $\epsilon_4 \ll 1$, is a predetermined number defining the permissible deviation.

If $$\frac{M_a}{M^{*}_n} \notin ]1-\epsilon_4; 1+\epsilon_4[,$$

the test 110 is negative. The measured values of pressures are considered to be unreliable, and the state of high credibility is maintained.

If $$\frac{M_a}{M^{*}_n} \in ]1-\epsilon_4; 1+\epsilon_4[,$$

the test is positive.

The second test 112 of pressure sensors is complementary to the first test 110. During this test 112, the computer 3 compares the pressure altitude $Z_P$ obtained at a given time instant from the measurement of the static pressure to the GPS pressure altitude $Z_P^{**}$ obtained at the same time instant, which is not dependent on the measurement of static pressure. If the measured static pressure value is correct, these two pressure altitudes should be substantially equal.

Thus, during the test 112, the altimeter 6 provides to the computer 3 the pressure altitude $Z_P$ in accordance with the phase 31 here above, and the computer 3 determines the GPS pressure altitude $Z_P^{}$, in accordance with the step 47 here above. The computer 3 then determines the difference $Z_P^{}-Z_P$, and verifies that this ratio is close to zero, that is to say, it is comprised in an interval $]-\in_5;+\in_5[$, where $\in_5$ is a predetermined number defining the permissible deviation.

If $Z^{**}_P-Z_P \notin ]-\in_5; +\in_5[$, the test 112 is negative. The measured static pressure value is considered to be unreliable, and the state of high credibility is maintained.

If $Z^{**}_P-Z_P \in ]-\in_5;+\in_5[$, the test 112 is positive.

In a step 113, the computer determines if two tests 110 and 112 substantially concurrent, for example carried out in an interval of time of the order of the second, are positive. If this is the case, the measurements of the pressure sensors are considered to be reliable. The computer 3 thus lifts the state of high credibility and activates the state of optimal credibility 74, described here above.

In the contrary case, the state of high credibility 84 is maintained.

Thus, during a configuration change or at take off, once the state of low credibility is lifted and the state of high credibility is established, the state of optimal credibility may be achieved if the tests 110 and 112 prove to be positive.

These two tests 110 and 112 thus provide the ability to reassess the credibility of pressure measurements during the flight, when these measurements have been deemed to not be credible, and to provide the pilot with data and information derived from these measurements when the pressure sensors are functioning again. Moreover the use of two additional tests also ensures better security.

Figure 6:
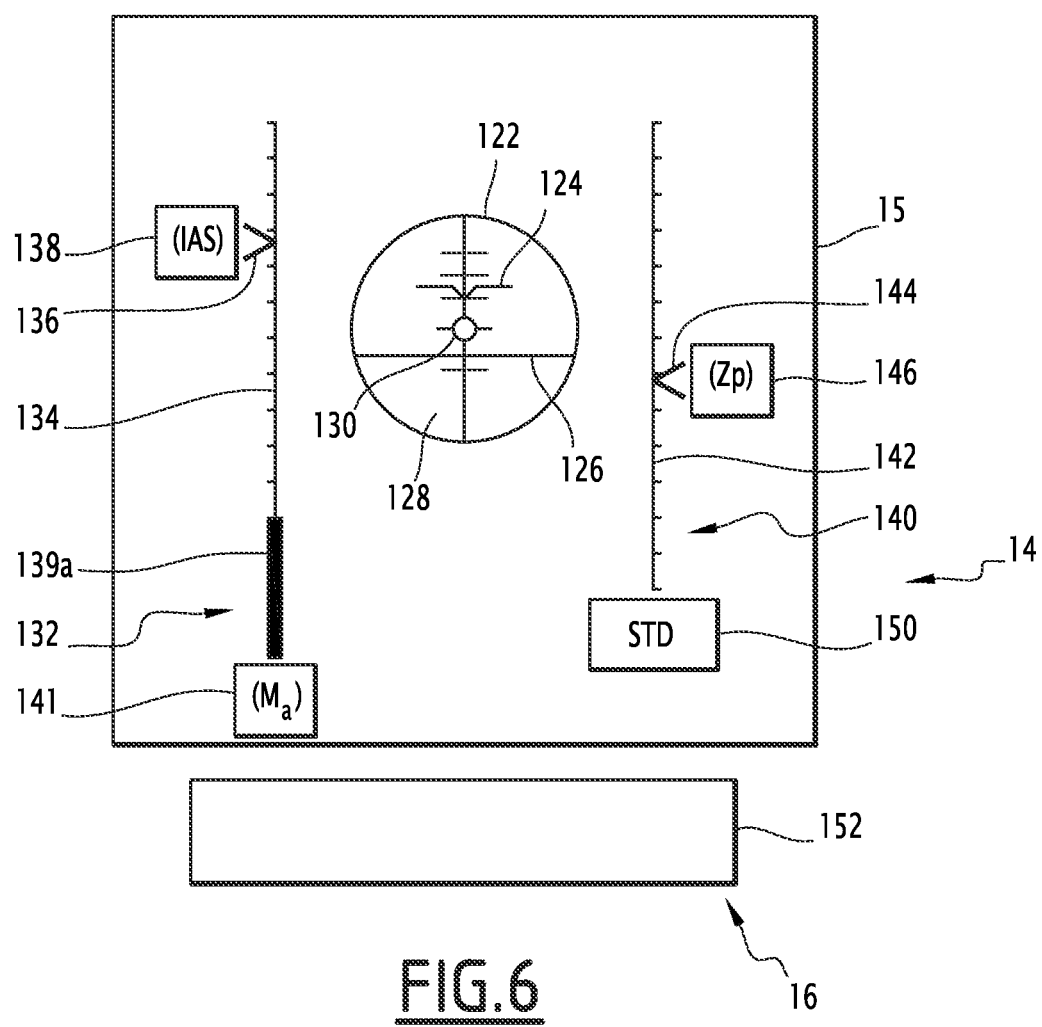
FIG. 6 illustrates a mode of representation by an auxiliary display device of a first set of data values relating to the flight.

Represented in FIG. 6 is an auxiliary display device 14 according to one embodiment of the invention.

As previously described, the auxiliary display device 14 is connected to the system 2 and in particular to the computer 3 of the aircraft 1, and receives information and commands from the latter.

The auxiliary display device 14 comprises the means 15 suitable for displaying evaluations of values of speed, altitude, angle-of-attack and flight path angle, selected based on estimations of the reliability of angle-of-attack and pressure sensors and transmitted by the computer 3. Such means 15 form a visual display device.

The auxiliary display device 14 displays, in the state of optimal credibility, so called "principle" flight characteristics of the aircraft, such as speed, altitude and Mach number, obtained from measurements made by the static pressure sensor 5a, total pressure sensor 5b and angle-of-attack sensor 5d.

When the measurements of at least one of these sensors are considered to be unreliable, each "principle" flight characteristic obtained from measurements of this sensor is replaced on the display device by an "auxiliary" flight characteristic homologous to the principle flight characteristic replaced, ie representative of the same flying characteristic and independent of any measurement from the sensor considered to be unreliable performed when the measurements of this sensor are considered to be unreliable.

Thus, the indicated air speed IAS is replaced by a speed (the high speed $EV^*_n$ or low speed $EV^{}$ equivalent), the pressure altitude $Z_P$ is replaced by an altitude (GPS pressure altitude $Z_P^{}$ or the altitude above the reference geoid $Z_{GPS}$), and the Mach number $M_a$ is replaced by a Mach number (high Mach number $M^*_n$ ou low Mach $M^{**}$)

Figure 7:
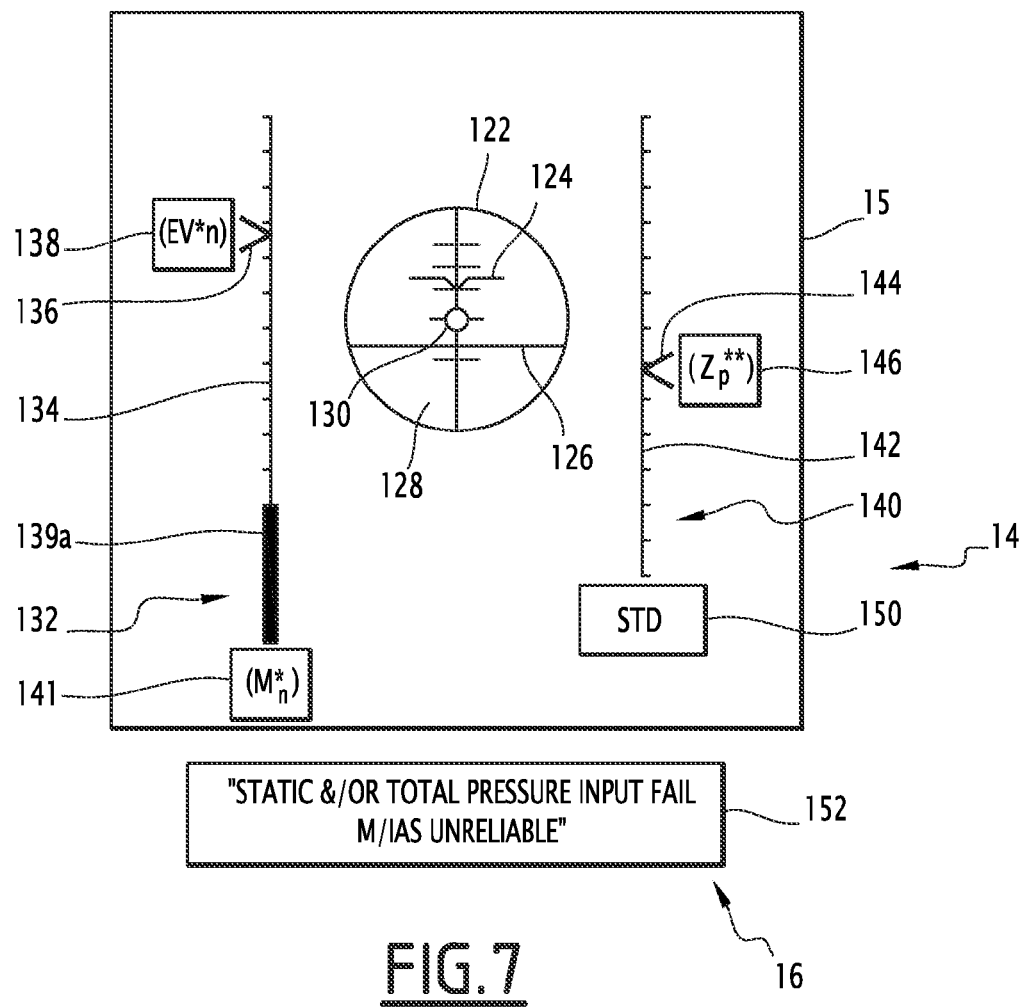
FIG. 7 illustrates a mode of representation by an auxiliary display device of a second set of data values relating to the flight.
Figure 8:
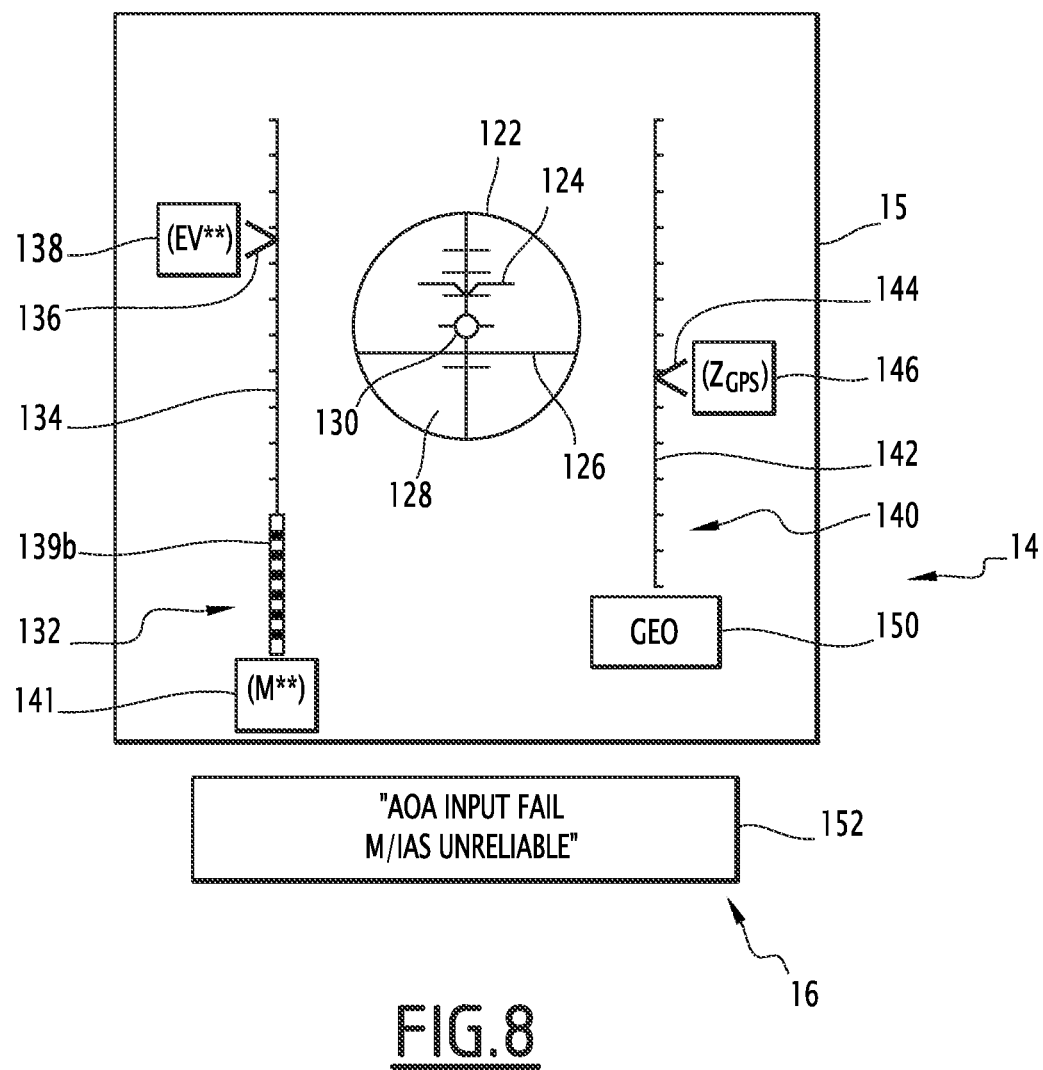
FIG. 8 illustrates a mode of representation by an auxiliary display device of a third set of data values relating to the flight.

The FIGS. 6, and 7 and 8 thus represent information projected on the device 15, displayed in the form of symbols, during the implementation of the method described above, when the aircraft 1 is in the state of optimal credibility 74, in the state of high credibility 84 and in the state of low credibility 76 respectively.

These symbols include an indicator 122 of flight control, displaying a symbol 124 of the aircraft model, occupying a constant position, which embodies a projection to infinity of the longitudinal axis X of the aircraft 1, and an artificial horizon line 126, in the centre of a scale slope 128. The position of the line 126 relative to the symbol 124 represents the pitch angle θ of the aircraft 1, this pitch angle being shown on the gradient scale 128 next to the artificial horizon line 126.

The indicator 122 also includes a velocity vector symbol 130, indicating the direction of the velocity vector of the aircraft relative to the air. This symbol 130 is located along the graduated gradient scale 128. The gap on the graduated gradient scale 128 between the symbol 124 of the model and the symbol 130 of the velocity vector is equal to the angle-of-attack α of the aircraft 1.

Advantageously, the symbols of model 124 and speed 130 are displayed only in the states of optimal credibility 74 or high credibility 84. The flight path angle and the angle-of-attack of the aircraft 1 are thus not displayed in the state of low credibility 76.

The device 15 also displays a speedometer 132. This indicator 132 includes a graduated speed scale 134, represented in the form of a segment extending between two fixed points, and a speed symbol 136 arranged facing the speed scale 134. The speed symbol 136 indicates a speed of the aircraft 1. The symbol 136 has for example a chevron shape.

One symbol 138, indicating in digital form the value of the speed, is added next to the speed symbol 136.

The indicated air speed depends on the state of credibility established by the computer 3. The speed displayed by means of the speed symbol 136 is for example the indicated air speed IAS in the state of optimal credibility 74, the high speed equivalent $EV^*_n$ in the state of high credibility 84 and the low speed equivalent $EV^{**}$ in the state of low credibility 76.

A symbol 141, disposed at the bottom of the graduated speed scale 134, indicates a Mach number of the aircraft. The type of Mach number displayed depends on the current state of credibility. In the state of optimal credibility 74, it is the Mach number $M_a$ derived from the Mach indicator 8, in the state of high credibility 84, the high Mach number $M^*_n$ is displayed, and in the state of low credibility 76, the low Mach number $M^{**}$ is displayed.

The symbols 138 and 141 are provided with an identification representative of the speed type and Mach number displayed, advantageously a colour code, in a manner such as to inform the pilot of the type of speed available to them. The selected colour code indicates in an intuitive manner what types of speed and Mach number are displayed. For example, the symbols 138 and 141 are green with green border in the state of optimal credibility 74, that is, when the indicated air speed IAS and the Mach number $M_a$ are displayed, green with yellow border in the state of high credibility 84, that is, when the high speed equivalent $EV^*_n$ and the high Mach number $M^*_n$ are displayed, and yellow with yellow border in the low credibility state 76, that is, when the low speed equivalent $EV^{}$ and low Mach number $M^{}$ are displayed.

As shown in FIG. 6, in the optimal state of credibility, the device 15 further displays, superimposed on the speedometer 132, a band 139a indicating the indicated stall speed $IAS_s$ of the aircraft 1. The band 139a is for example red in colour. In the state of high credibility 84, an identical band 139a indicates the high stall speed equivalent $EV^*_S$.

In the state of low credibility 76, the band 139a is replaced by a discontinuous 139b red band, as shown in FIG. 8. The band 139b shows the low stall speed equivalent $EV^{**}_S$ described here above.

The device 15 also displays an altitude indicator 140. This indicator 140 comprises a graduated altitude scale 142, represented in the form of a segment extending between two fixed points, and an altitude symbol 144, disposed opposite the altitude scale 142. The altitude symbol 144 indicates an altitude of the aircraft 1. The symbol 144 has for example a chevron shape.

A symbol 146 indicating in numerical form the value of the altitude, is added next to the altitude symbol 144.

The indicated altitude depends on the state of credibility established by the computer 3. In the state of optimal credibility 74, the altitude displayed by means of the altitude symbol 144 is, for example the pressure altitude $Z_P$ or, at the choice of the pilot, a corrected altitude of the setting, denoted by $Z_C$. The setting is for example a QNH (Q code—Nautical Height) or QFE (Q code—Field Elevation) setting. The QFE is an international code to be used for the setting of the altimeter in relation to a given land area such that it indicates a zero altitude when the aircraft is on the ground in this land area.

In the state of high credibility 84 or low credibility 76, the altitude displayed by means of the altitude symbol 144 is the GPS pressure altitude $Z_P^{**}$ or, at the pilot's choice, the altitude above the reference geoid $Z_{GPS}$, given by the GPS sensor.

Such choices between $Z_P$ or $Z_C$ and $Z_P^{}$ or $Z_{GPS}$ can be made by means of the input interface 17**, for example by pressing a dedicated button.

The device 15 then indicates, in a reserved locational position 150, on which reference the altitude is set. For example, in the state of optimal credibility 74, if the displayed altitude is the pressure altitude $Z_P$, the setting "STD" is displayed in the location 150, as shown in FIG. 6. If the altitude displayed is a corrected altitude of the setting $Z_C$, "QNH" or "QFE" is displayed in the location 150, depending on the setting selected.

In the state of high credibility 84 or low credibility 76, if the GPS altitude pressure $Z_P^{}$ is displayed, the setting "STD" is displayed in the location 150, as represented in FIG. 7. If the altitude $Z_{GPS}$ above the reference geoid is displayed, the setting "GEO" is displayed in the location 150, as represented in FIG. 8**.

The symbol 146 is provided with an identification representative of the type of altitude displayed, advantageously a colour code. The selected colour code indicates in an intuitive manner what type of speed is displayed. For example, the symbol 146 is green with green border in the state of optimal credibility 74, i.e. when the altitude $Z_P$ or $Z_C$ is displayed, green with yellow border when loose hybridisation of $Z_P^{}$ by $Z_P$ is in progress, and yellow with yellow border when loose hybridisation of $Z_P^{}$ by $Z_P$ is stopped. The symbol 146 with yellow border thus signifies that the GPS altitude pressure $Z_P^{}$ or the altitude above the reference geoid $Z_{GPS}$ is displayed, and the colour of the symbol itself indicates whether the process of loose hybridisation of $Z_P^{}$ on $Z_P$ is in progress or not.

The auxiliary display device 14 is in addition supplemented by means 16 for displaying warning—alert messages as previously described above. These means 16 include, for example a display window 152, suitable for displaying text based messages intended to inform the pilot of the state of credibility assigned to sensor measurements, and the reliability of the measurements displayed by the conventional aircraft instrumentation panel. This window 152 is for example integrated within a system for alerting the crew (or CAS for Crew Alerting System).

For example, in the state of high credibility, the window 152 displays a message indicating to the pilot that the measurements of the pressure sensors 5a, 5b are not reliable, and a message indicating that the speeds displayed by the conventional aircraft instrumentation panel are probably incorrect. These messages are for example of the following type: "STATIC &/or total pressure input fail" and "M/IAS unreliable (caution))", respectively, as illustrated in FIG. 7.

In the state of low credibility 76 the window 152 displays a message indicating to the pilot that the measurements of the pressure sensors 5a, 5b and angle-of-attack sensor 5d are not reliable, and a message indicating that the speeds displayed by the conventional aircraft instrumentation panel are probably incorrect. These messages are for example of the following type: "AOA input fail" and "M/IAS unreliable (caution)", respectively, as illustrated in FIG. 8. The auxiliary display device according to the invention therefore ensures the ability to provide the pilot at any time, with reliable flight operation and control information. Indeed, when the measurements of at least one sensor from the static pressure sensor (5a), total pressure sensor (5b) and angle-of-attack sensor (5d) are considered to be unreliable, each flight characteristic determined on the basis of measurements made by these sensors is replaced on the auxiliary display device by an auxiliary flight characteristic. Each auxiliary flight characteristic is independent of any sensor measurement performed at a time when the sensor is considered to be unreliable.

Auxiliary flight characteristics may however depend on measurements of the or each sensor deemed to be unreliable that were performed at a prior time, when these sensors were considered to be reliable.

The auxiliary display device according to the invention also provides the ability to notify the crew in case of suspicion of failure of one or more sensors.

The method and system according to the invention thus ensures the ability to provide the crew of an aircraft with an assessment of the reliability of the flight characteristics deriving from measurements made by the aircraft's sensors, and to alert them in case of potential failure. Furthermore, this method and system provide the ability to reassess in a continual and ongoing manner the reliability of the sensors in order to detect a possible restoring to proper working order of sensors considered to be unreliable or conversely a failure of a sensor previously considered to be reliable.

The method and the system according the invention also ensure the ability to provide the crew with auxiliary flight characteristics that are independent of sensor measurements considered to be unreliable. Thus, even in case of failure of the pressure and/or angle-of-attack sensors, reliable values for flight characteristics are made available to the crew.

It should be understood that the examples of embodiments presented here above are non limiting.

In particular, verifying whether the equation of lift is satisfied in steps 70 and 78 may be carried out according to a form other than that previously described above. In particular, it may entail the involvement of another type of speed data value other than the Mach number $M_a$.

Additionally, the auxiliary flight characteristics may be determined in accordance with other expressions, and possibly from other types of sensors aside from a GPS sensor, for example, another type of satellite positioning sensor, a Doppler radar, or an inertial navigation unit.

The coefficient of lift may also be projected onto a different axis than the axis Z represented, for example along an axis perpendicular to the velocity vector.

Furthermore, the auxiliary display device may display other auxiliary information, such as the static temperature or the horizontal wind estimator.

By way of a variant, the aircraft 1 comprises a plurality of redundant sensors of the same type, for example, multiple static and total pressure sensors and/or multiple angle-of-attack sensors. According to this variant, for example the computer tests the reliability of each of the sensors of the same type separately. Thus, if only one single sensor of a given type is considered to be reliable, the computer 3 uses the measurements deriving from this sensor, and alerts the pilot as to a failure of the other sensor(s) of the same type. If all of the sensors of a same given type are found to be unreliable, the computer 3 activates a state of high or low credibility as appropriate, in accordance with the method described above.

Quite obviously, other embodiments may be envisaged.

In addition, the technical characteristics of the embodiments and variants mentioned here above may be combined with each other.

The invention claimed is:

1. A method for providing a crew of an aircraft with speed information for operating the aircraft during a flight of the aircraft, the aircraft comprising at least one angle-of-attack sensor performing measurements during the flight of the aircraft and static pressure and total pressure sensors, the method comprising:
   determining, by a computer in the aircraft, at least one angle-of-attack value of the aircraft from at least one measurement from the angle-of-attack sensor;
   analyzing, by the computer, the accuracy of the at least one angle-of-attack value, to determine whether the at least one angle-of-attack sensor is malfunctioning by testing a coherence between angle-of-attack measurements of the aircraft, coming from the angle-of-attack sensor, and measurements of at least one flight characteristic of the aircraft, distinct from the angle-of-attack and determined independently of any measurements from the static pressure and total pressure sensors, the testing comprising:
      determining, by the computer, at least one value of the flight characteristic of the aircraft;
      determining, by the computer, a value of at least one indicator of the coherence of the angle-of-attack value with the value of the flight characteristic;
   analyzing, by the computer, based on the value of the indicator, if the measurements of the angle-of-attack sensor are unreliable or coherent with the measurements of the flight characteristic, and
   if the measurements of the angle-of-attack sensor are deemed unreliable:
      determining the speed information independent of the measurements from the angle-of-attack sensor, and displaying, by a display in the aircraft, the speed information of the aircraft determined independent of the measurements from the angle-of-attack sensor to the crew of the aircraft, and
   if the measurements of the angle-of-attack sensor are deemed coherent with the measurements of the flight characteristic:
      determining the speed information dependent on the measurements from the angle-of-attack sensor, and directing the display of, by the display in the aircraft, the speed information of the aircraft determined dependent on the measurements from the angle-of-attack sensor to the crew of the aircraft.

2. The method as recited in claim 1 wherein the testing a coherence includes a dynamic coherence test, in which the flight characteristic is a load factor of the aircraft, the measurements of the angle-of-attack sensor being deemed unreliable, or deemed coherent with the measurements of the load factor as a function of the value of the coherence indicator.

3. The method as recited in claim 2 wherein the coherence indicator measures a dynamic coherence between the angle-of-attack and load factor values over first and second time intervals.

4. The method as recited in claim 2 wherein the coherence indicator is a statistic correlation coefficient between the angle-of-attack values and the load factor values over the first and second time intervals, determined in the form:

$$Corr_\phi(n_Z, \alpha) = \frac{Cov_\phi(n_Z, \alpha)}{\varepsilon_{n_Z}\varepsilon_\alpha},$$

where $Cov_\phi(n_Z,\alpha)$ designates a covariance between angle-of-attack values $\alpha$ and load factor values $n_Z$, designates a standard deviation of the angle-of-attack values $\alpha$ over the first time interval and designates a standard deviation of the load factor values $n_Z$ over the second time interval.

5. The method as recited in claim 2 further comprising comparing an absolute value of the coherence indicator with a predetermined correlation threshold, the measurements of the angle-of-attack sensor being deemed unreliable if the coherence indicator is below the correlation threshold, and the measurements of the angle-of-attack sensor being deemed coherent with the measurements of the load factor if the coherence indicator is above or equal to the correlation threshold.

6. The method as recited in claim 2 wherein the dynamic coherence test includes comprises a prior determination step for determining a relevance of the dynamic coherence test, comprising determining a dispersion value of the load factor values over the second time interval, the dynamic coherence test being deemed relevant if the dispersion value is greater than or equal to a predetermined dispersion threshold and irrelevant if the dispersion value is below the dispersion threshold.

7. The method as recited in claim 6 wherein results of the dynamic coherence test are not taken into account when the dynamic coherence test is deemed irrelevant.

8. The method as recited in claim 1 wherein the testing a coherence includes a static coherence test, in which the flight characteristic is a pitch angle of the aircraft, the coherence indicator measuring a static coherence between the value of the angle-of-attack and a pitch angle value, the measurements of the angle-of-attack sensor being deemed unreliable, or deemed coherent with the measurements of the pitch angle as a function of the value of the coherence indicator.

9. The method as recited in claim 8 wherein the determination of a coherence indicator between the angle-of-attack value and the pitch angle value comprises determining a difference between the pitch angle value and the angle-of-attack value, the angle-of-attack and pitch angle values being deemed coherent if the absolute value of the difference is below a predetermined difference threshold and not coherent if the absolute value of the difference is above the predetermined difference threshold.

10. The method as recited in claim 8 wherein the static coherence test comprises a prior determination step for determining a relevance of the static coherence test, comprising determining a flight path angle of the aircraft and a bank angle of the aircraft and comparing the flight path angle to a predetermined threshold, and comparing the bank angle to a predetermined bank angle threshold, the static coherence test being deemed relevant if the flight path angle and the bank angle are below or equal to the flight path angle and bank angle thresholds, respectively, and irrelevant if the flight path angle is above the flight path angle threshold and/or the bank angle is below the bank angle threshold.

11. The method as recited in claim 10 wherein results of the static coherence test are not taken into account when the static coherence test is deemed irrelevant.

12. The method as recited in claim 8 wherein the testing a coherence includes a dynamic coherence test, in which the flight characteristic is a load factor of the aircraft, the measurements of the angle-of-attack sensor being deemed unreliable, or deemed coherent with the measurements of the load factor as a function of the value of the coherence indicator of the dynamic coherence test, the measurements of the angle-of-attack sensor being deemed reliable, when the measurements of the angle-of-attack sensor are deemed coherent with the measurements of the load factor and the measurements of the pitch angle in a time interval below a predetermined threshold, the method comprising, when the measurements of the angle-of-attack sensor are deemed reliable, determining speed information dependent on the measurements from the angle-of-attack sensor and providing a crew of the aircraft with the information.

13. The method as recited in claim 1, wherein the speed information independent of the measurements from the angle-of-attack sensor comprise a true air speed of the aircraft, determined from a speed of the aircraft relative to a ground and an estimate of a wind speed.

14. The method as recited in claim 1, wherein the speed information independent of the measurements from the angle-of-attack sensor comprise a Mach number determined from:
 a true air speed of the aircraft, determined from a speed of the aircraft relative to the ground and an estimate of a wind speed, and
 an estimate of a surrounding static temperature.

15. The method as recited in claim 14, wherein the estimate of the surrounding static temperature is determined from an estimated value of an altitude of the aircraft.

16. The method as recited in claim 1, wherein the speed information independent of the measurements from the angle-of-attack sensor comprise a speed equivalent, determined from:
 a Mach number, determined from:
  a true air speed of the aircraft, determined from a speed of the aircraft relative to a ground and an estimate of a wind speed, and
  an estimate of a surrounding static temperature; and
 an estimated value of a static pressure surrounding the aircraft, determined independently of any measurements from the static pressure and total pressure sensors from an estimated value of an altitude of the aircraft.

17. A system for providing a crew of an aircraft with speed information for operating the aircraft during a flight of the aircraft, the aircraft comprising at least one angle-of-attack sensor preforming measurements during a flight of the aircraft and static pressure and total pressure sensors, comprising:
 a display in the aircraft configured for displaying the speed information of the aircraft to the crew;
 a computer configured for determining at least one angle-of-attack value of the aircraft from at least one measurement from the angle-of-attack sensor,
 the computer being configured for analyzing the accuracy of the at least one angle-of-attack value to determine whether the at least one angle-of-attack sensor is malfunctioning by carrying out at least one coherence test between angle-of-attack measurements of the aircraft, coming from the angle-of-attack sensor, and measurements of at least one flight characteristic of the aircraft, separate from the angle-of-attack and determined independently of any measurements from the static pressure and total pressure sensors,
 the computer being configured to determine at least one value of the flight characteristic of the aircraft,
 the computer being configured to determine a value of at least one indicator of the coherence of the angle-of-attack value with the value of the flight characteristic,
 the computer being configured to analyze, based on the value of the indicator, if the measurements of the angle-of-attack sensor are unreliable or coherent with the measurements of the flight characteristic, and
 if the measurements of the angle-of-attack sensor are deemed unreliable:
  determining the speed information independent of the measurements from the angle-of-attack sensor,
   and directing the display of, by the display in the aircraft, the speed information of the aircraft determined independent of the measurements from the angle-of-attack sensor to the crew of the aircraft, and
 if the measurements of the angle-of-attack sensor are deemed coherent with the measurements of the flight characteristic:
  determining the speed information dependent on the measurements from the angle-of-attack sensor,
   and directing the display of, by the display in the aircraft, the speed information of the aircraft determined dependent on the measurements from the angle-of-attack sensor to the crew of the aircraft.

18. A method for providing a crew of an aircraft with speed information for operating the aircraft during a flight of the aircraft, the aircraft comprising at least one angle-of-attack sensor performing measurements during the flight of the aircraft, the method comprising:
 determining, by a computer in the aircraft, at least one angle-of-attack value of the aircraft from at least one measurement from the angle-of-attack sensor;
 analyzing, by the computer, the accuracy of the at least one angle-of-attack value, to determine whether the at least one angle-of-attack sensor is malfunctioning by testing a coherence between angle-of-attack measurements of the aircraft, coming from the angle-of-attack sensor, and measurements of at least one flight characteristic of the aircraft, the testing including a dynamic coherence test in which the flight characteristic is a load factor of the aircraft, the dynamic coherence test comprising:
  determining, by the computer, at least one value of the load factor of the aircraft;
  determining, by the computer, a value of at least one indicator of the coherence of the angle-of-attack value with the value of the load factor, the coherence indicator measuring a dynamic coherence between the angle-of-attack values and load factor values over first and second time intervals;

analyzing, by the computer, based on the value of the indicator, if the measurements of the angle-of-attack sensor are unreliable or coherent with the measurements of the load factor, and if the measurements of the angle-of-attack sensor are deemed unreliable:
  determining the speed information independent of the measurements from the angle-of-attack sensor,
  and displaying, by a display in the aircraft, the speed information of the aircraft determined independent of the measurements from the angle-of-attack sensor to the crew of the aircraft, and if the measurements of the angle-of-attack sensor are deemed coherent with the measurements of the load factor:
  determining the speed information dependent on the measurements from the angle-of-attack sensor,
  and directing the display of, by the display in the aircraft, the speed information of the aircraft determined dependent on the measurements from the angle-of-attack sensor to the crew of the aircraft.

19. The method as recited in claim 18 wherein the coherence indicator is a statistic correlation coefficient between the angle-of-attack values and the load factor values over the first and second time intervals, determined in the form:

$$Corr_\phi(n_Z, \alpha) = \frac{Cov_\phi(n_Z, \alpha)}{\varepsilon_{n_Z}\varepsilon_\alpha},$$

where $Cov_\phi(n_Z,\alpha)$ designates a covariance between angle-of-attack values $\alpha$ and load factor values $n_Z$, $\varepsilon_\alpha$ designates a standard deviation of the angle-of-attack values $\alpha$ over the first time interval and $\varepsilon_{n_Z}$ designates a standard deviation of the load factor values $n_Z$ over the second time interval.

20. The method as recited in claim 18 further comprising comparing an absolute value of the coherence indicator with a predetermined correlation threshold, the measurements of the angle-of-attack sensor being deemed unreliable if the coherence indicator is below the correlation threshold, and the measurements of the angle-of-attack sensor being deemed coherent with the measurements of the load factor if the coherence indicator is above or equal to the correlation threshold.

21. The method as recited in claim 18 wherein the dynamic coherence test includes a prior determination of a relevance of the dynamic coherence test, comprising determining a dispersion value of the load factor values over the second time interval, the dynamic coherence test being deemed relevant if the dispersion value is greater than or equal to a predetermined dispersion threshold and irrelevant if the dispersion value is below the dispersion threshold.

22. The method as recited in claim 21, wherein results of the dynamic coherence test are not taken into account when the dynamic coherence test is deemed irrelevant.

23. A method for providing a crew of an aircraft with speed information for operating the aircraft during a flight of the aircraft, the aircraft comprising at least one angle-of-attack sensor performing measurements during the flight of the aircraft, the method comprising:

determining, by a computer in the aircraft, at least one angle-of-attack value of the aircraft from at least one measurement from the angle-of-attack sensor;

analyzing, by the computer, the accuracy of the at least one angle-of-attack value to determine whether the at least one angle-of-attack sensor is malfunctioning by testing a coherence between angle-of-attack measurements of the aircraft, coming from the angle-of-attack sensor, and measurements of at least one flight characteristic of the aircraft, the testing including a static coherence test in which the flight characteristic is a pitch angle of the aircraft, the static coherence test comprising:

determining, by the computer, at least one value of the pitch angle of the aircraft;

determining, by the computer, a value of at least one indicator of the coherence of the angle-of-attack value with the value of the pitch angle, the coherence indicator measuring a static coherence between the value of the angle-of-attack and a pitch angle value;

analyzing, by the computer, based on the value of the indicator, if the measurements of the angle-of-attack sensor are unreliable or coherent with the measurements of the pitch angle, and if the measurements of the angle-of-attack sensor are deemed unreliable:
  determining the speed information independent of the measurements from the angle-of-attack sensor,
  and displaying, by a display in the aircraft, the speed information of the aircraft determined independent of the measurements from the angle-of-attack sensor to the crew of the aircraft, and if the measurements of the angle-of-attack sensor are deemed coherent with the measurements of the pitch angle:
  determining the speed information dependent on the measurements from the angle-of-attack sensor,
  and directing the display of, by the display in the aircraft, the speed information of the aircraft determined dependent on the measurements from the angle-of-attack sensor to the crew of the aircraft.

24. The method as recited in claim 23, wherein the determination of a coherence indicator between the angle-of-attack value and the pitch angle value comprises determining a difference between the pitch angle value and the angle-of-attack value, the angle-of-attack and pitch angle values being deemed coherent if the absolute value of the difference is below a predetermined difference threshold and not coherent if the absolute value of the difference is above the predetermined difference threshold.

25. The method as recited in claim 23 wherein the static coherence test comprises a prior determination step for determining a relevance of the static coherence test, comprising determining a flight path angle of the aircraft and a bank angle of the aircraft and comparing the flight path angle to a predetermined threshold, and comparing the bank angle to a predetermined bank angle threshold, the static coherence test being deemed relevant if the flight path angle and the bank angle are below or equal to the flight path angle and bank angle thresholds, respectively, and irrelevant if the flight path angle is above the flight path angle threshold and/or the bank angle is below the bank angle threshold.

26. The method as recited in claim 25, wherein results of the static coherence test are not taken into account when the static coherence test is deemed irrelevant.

27. The method as recited in claim 23 wherein the testing a coherence further includes a dynamic coherence test, in which the flight characteristic is a load factor of the aircraft, the measurements of the angle-of-attack sensor being deemed unreliable, or deemed coherent with the measurements of the load factor as a function of the value of the coherence indicator, the method further comprising, when the first and second intermediate states of credibility are successively activated in a time interval below a predetermined threshold, the method comprising, when the measurements of the angle-of-attack sensor are deemed reliable, determining speed information dependent on the measurements from the angle-of-attack sensor.

28. A system for providing a crew of an aircraft with speed information for operating the aircraft during a flight of the aircraft, the aircraft comprising at least one angle-of-attack sensor preforming measurements during the flight of the aircraft, comprising:
a display in the aircraft configured for displaying the speed information of the aircraft to the crew;
a computer configured for determining at least one angle-of-attack value of the aircraft from at least one measurement from the angle-of-attack sensor,
the computer being configured for analyzing the accuracy of the at least one angle-of-attack value to determine whether the at least one angle-of-attack sensor is malfunctioning by carrying out at least one dynamic coherence test between angle-of-attack measurements of the aircraft, coming from the angle-of-attack sensor, and measurements of at a load factor of the aircraft,
the computer being configured to determine at least one value of the load factor of the aircraft,
the computer being configured to determine a value of at least one indicator of the coherence of the angle-of-attack value with the value of the load factor,
the computer being configured to analyze, based on the value of the indicator, if the measurements of the angle-of-attack sensor are unreliable or coherent with the measurements of the load factor, and
if the measurements of the angle-of-attack sensor are deemed unreliable:
determining the speed information independent of the measurements from the angle-of-attack sensor,
and directing the display of, by the display in the aircraft, the speed information of the aircraft determined independent of the measurements from the angle-of-attack sensor to the crew of the aircraft, and
if the measurements of the angle-of-attack sensor are deemed coherent with the measurements of the load factor:
determining the speed information dependent on the measurements from the angle-of-attack sensor,
and directing the display of, by the display in the aircraft, the speed information of the aircraft determined dependent on the measurements from the angle-of-attack sensor to the crew of the aircraft.

29. A system for providing a crew of an aircraft with speed information for operating the aircraft during a flight of the aircraft, the aircraft comprising at least one angle-of-attack sensor preforming measurements during the flight of the aircraft, comprising:
a display in the aircraft configured for displaying the speed information of the aircraft to the crew;
a computer configured for determining at least one angle-of-attack value of the aircraft from at least one measurement from the angle-of-attack sensor,
the computer being configured for analyzing the accuracy of the at least one angle-of-attack value to determine whether the at least one angle-of-attack sensor is malfunctioning by carrying out at least one static coherence test between angle-of-attack measurements of the aircraft, coming from the angle-of-attack sensor, and measurements of a pitch angle of the aircraft,
the computer being configured to determine at least one value of the pitch angle of the aircraft,
the computer being configured to determine a value of at least one indicator of the coherence of the angle-of-attack value with the value of the pitch angle,
the computer being configured to analyze, based on the value of the indicator, if the measurements of the angle-of-attack sensor are unreliable or coherent with the measurements of the pitch angle, and
if the measurements of the angle-of-attack sensor are deemed unreliable:
determining the speed information independent of the measurements from the angle-of-attack sensor,
and direct the display of, by a display in the aircraft, the speed information of the aircraft determined independent of the measurements from the angle-of-attack sensor to the crew of the aircraft, and
if the measurements of the angle-of-attack sensor are deemed coherent with the measurements of the pitch angle:
determining the speed information dependent on the measurements from the angle-of-attack sensor,
and directing the display of, by the display in the aircraft, the speed information of the aircraft determined dependent on the measurements from the angle-of-attack sensor to the crew of the aircraft.

* * * * *